United States Patent [19]

Nishida et al.

[11] Patent Number: 5,475,494
[45] Date of Patent: Dec. 12, 1995

[54] DRIVING ENVIRONMENT SURVEILLANCE APPARATUS

[75] Inventors: Minoru Nishida; Yoshihiko Utsui; Noriyuki Inoue, all of Hyogo, Japan

[73] Assignee: Mitsubishi Denki Kabushiki Kaisha, Tokyo, Japan

[21] Appl. No.: 167,665

[22] Filed: Dec. 15, 1993

[30] Foreign Application Priority Data

| Dec. 22, 1992 | [JP] | Japan | 4-342427 |
| Feb. 15, 1993 | [JP] | Japan | 5-025214 |
| Nov. 30, 1993 | [JP] | Japan | 5-300528 |

[51] Int. Cl.$^6$ ............... G01C 3/00; B60T 7/16; B60Q 1/00
[52] U.S. Cl. .......... 356/4.01; 180/169; 340/435; 340/436; 340/903; 356/4.03; 364/461
[58] Field of Search ................. 356/4.01, 4.03, 356/5.01, 5.1; 180/169; 364/461; 342/455; 340/435, 436, 903, 904

[56] References Cited

U.S. PATENT DOCUMENTS

| 4,195,425 | 4/1980 | Leitz et al. | 180/169 |
| 4,257,703 | 3/1981 | Goodrich | 356/4.03 |
| 4,477,184 | 10/1984 | Endo . | |
| 4,833,469 | 5/1989 | David | 340/901 |
| 4,931,937 | 6/1990 | Kakinami et al. | |
| 5,166,681 | 11/1992 | Bottesch et al. | 180/167 |
| 5,214,408 | 5/1993 | Asayama | 340/435 |
| 5,227,786 | 7/1993 | Hancock | 340/961 |
| 5,309,137 | 5/1994 | Kajiwara | 340/436 |

FOREIGN PATENT DOCUMENTS

| 3832720A1 | 3/1990 | Germany . |
| 4110132A1 | 10/1991 | Germany . |

OTHER PUBLICATIONS

Von Delano L. Klipstein "Mit 90 km/h unterwegs . . . " Technische Rundschau, pp. 30–34.

Primary Examiner—Stephen C. Buczinski
Attorney, Agent, or Firm—Wolf, Greenfield & Sacks

[57] ABSTRACT

A driving environment surveillance apparatus is provided to specify a region where an obstacle is present depending upon an azimuth detected by an obstacle detecting unit so as to derive a two-dimensional image corresponding to the specified region from an image detecting unit, and to extract the obstacle from the two-dimensional image so as to calculate a size index of the obstacle, thereby detecting a relative distance or the azimuth to the obstacle from a vehicle with high accuracy and at a high speed.

12 Claims, 23 Drawing Sheets

REGION I $$S_1 = \sqrt{x_1^2 + y_1^2}$$

REGION II $$S_2 = \sqrt{x_2^2 + y_2^2}$$

$$S_3 = \sqrt{x_3^2 + y_3^2}$$

TIME t = t

TIME t = t₁ + Δt = t₂

$$S_1 = \sqrt{x_1^2 + y_1^2}$$

$$S_2 = \sqrt{x_2^2 + y_2^2}$$

DRIVING ENVIRONMENT SURVEILLANCE APPARATUS

BACKGROUND OF THE INVENTION

1. Field of the Invention

The present invention relates to a driving environment surveillance apparatus for detecting obstacle in front of a running vehicle to inform a driver for easily recognizing the presence of the obstacles.

2. Description of the Prior Art

Conventionally, as the technologies of this kind, there are known an active type one (disclosed in Japanese Patent Publication (Kokoku) No. 60-4011 and so forth) in which a microwave or infrared laser light is transmitted and the reflected signal from obstacles and so forth is received to detect the distance between vehicles, the presence of the obstacles, the relative distance, the relative speed, and so forth, and a passive type one (disclosed in Japanese Patent Publication (Kokoku) No. 63-38085, Japanese Patent Publication (Kokoku) No. 63-46363, Japanese Patent Publication (Kokai) No. 63-52300, and so forth) in which an image sensor is used to catch an object in front of the vehicle as an image data and so as to detect an obstacle (including another vehicle) by means of image processing, whereby the distance to the obstacle is detected based on the principle of the triangulation by two sets of optical system. Both of these conventional technologies, although the systems are different to each other, detect the presence or absence of an obstacle on the front periphery of the running own vehicle, the relative distance to the obstacle, and the relative speed, to output the distance data or the speed data to the driver of the own vehicle.

FIG. 1 is a plan view showing a conventional driving environment surveillance apparatus disclosed in, for example, the Japanese Patent Publication (Kokoku) No. 61-6349. In the drawing, reference numeral 1 is a vehicle equipped with a laser radar 4, 2 is an obstacle (for example, a vehicle stopping on a side of a road) which is present on the left side in a travelling direction of the vehicle 1, and 3 is another obstacle (for example, a post box) which is present on the right side in the travelling direction of the vehicle 1.

Also, reference numeral 4 means the laser radar which is provided in the most-front of the vehicle 1 to emit a light beam 6 so as to scan in the range of $-10°<\theta<+10°$ with respect to a center point of the front-end of the vehicle. In the laser radar 4, a scanning interval $\Delta\theta$ (i.e., an interval between adjacent light beams 6) is set at 0.1°.

A description will now be given of the operation.

When the laser radar 4 emits the light beam 6 sequentially starting from the most left end (N=0) toward the right side, the light beams 6 from N=g to N=i return to the vehicle 1 as reflected lights due to the presence of the obstacle 2, and the laser radar 4 receives the reflected lights. In this connection, the laser radar 4 can not receive the light beam 6 for N=i+1 because of reflection by a side surface of the obstacle 2.

Here, it is assumed that $P_1$ means a reflection point of the light beam 6 at the most right end (N=i) whose reflected light from the obstacle 2 can be received by the laser radar 4. Accordingly, a distance $QP_1$ can be detected as $QP_1=R_1$ based upon a reflection time, and a distance $P_1P_3$ ($=y_1$) from $P_1$ to the center line (the z-axis) of the vehicle can be expressed as follows:

$$P_1P_3 = y_1 \approx R_1 \cdot \theta_i \qquad (1)$$

where $\theta_i$ means a deflection angle of the light beam 6 for N=i (the deflection angle $\theta_i$ being a known number for the laser radar 4). Further, it is assumed that $P_2$ means a reflection point of the light beam 6 at the most left end (N=g) whose reflected light from the obstacle 2 can be received by the laser radar 4. Thereby, it is similarly possible to detect a distance $QP_2$ as $QP_2=R_2$ based upon the reflection time. A distance $P_2P_4$ ($=y_2$) from the point $P_2$ to the center line (the z-axis) of the vehicle can be expressed as follows:

$$P_2P_4 = y_2 \approx R_2 \cdot \theta_g \qquad (2)$$

where $\theta_g$ means a deflection angle of the light beam 6 for N=g (the deflection angle $\theta_g$ being a known number for the laser radar 4). Accordingly, the recognition of the positions $P_1$ and $P_2$ enables recognition of the relative distance or the azimuth from the vehicle 1 to the obstacle 2.

Detection of the obstacle 3 is identical with that of the obstacle 2, and a description thereof is omitted.

Since a detecting method in a height direction of the obstacles 2 and 3 is identical with that in the horizontal direction in principle, a description thereof is also omitted. In this connection, FIG. 2 shows the light beam 6 emitted from the laser radar 4 to extend in the height direction.

The conventional driving environment surveillance apparatus is constructed as set forth above. Therefore, it is necessary to provide a fine interval $\Delta\theta$ between the light beams 6 emitted from the laser radar 4 in order to detect the relative distance or the azimuth from the vehicle 1 to the obstacles 2 and 3 with high accuracy. However, as the interval $\Delta\theta$ between the light beams 6 becomes more fine, a longer time is required for detecting the obstacles 2 and 3. As a result, there are problems in that, for example, real-time detected data of the obstacles 2 and 3 can not be provided, and the conventional apparatus is not practical for the vehicle in a running condition.

SUMMARY OF THE INVENTION

In view of the foregoing, it is an object of the present invention to provide a driving environment surveillance apparatus which enables high speed detection even in case of accurate detection of a relative distance and an azimuth to an obstacle from a vehicle.

It is another object of the present invention to provide a driving environment surveillance apparatus which predicts and indicates an amount of movement of an obstacle so as to enable a driver to more accurately decide potential of collision.

It is still another object of the present invention to provide a driving environment surveillance apparatus in which a driver can easily and intuitively recognize a size and so forth of the obstacle.

It is a further object of the present invention to provide to a driving environment surveillance apparatus which can clearly display an obstacle which is small but may be seriously dangerous.

It is a further object of the present invention to provide to a driving environment surveillance apparatus which can inform a driver of presence of an obstacle even if a temporary error should occur in image processing.

According to the first aspect of the present invention, for achieving the above-mentioned objects, there is provided a driving environment surveillance apparatus which specifies a region where an obstacle is present depending upon an azimuth detected by an obstacle detecting unit so as to derive a two-dimensional image corresponding to the specified region from an image detecting unit, and extracts the obstacle from the two-dimensional image to calculate a size index of the obstacle.

As stated above, in the driving environment surveillance apparatus according to the first aspect of the present invention, an image processing region limiting unit is provided to specify the region where an obstacle is present depending upon the azimuth detected by the obstacle detecting unit so as to derive a two-dimensional image corresponding to the specified region from the image detecting unit. Thereby, an obstacle extracting unit on a subsequent stage only has to extract the obstacle from only the two-dimensional image corresponding to the specified region, resulting in a reduced processing time. Further, the obstacle extracting unit is provided to extract the obstacle from the two-dimensional image so as to calculate the size index of the obstacle. Therefore, the obstacle detecting unit may have detection accuracy to such a degree that presence of the obstacle can be detected (i.e., accuracy to such a degree that a position of the obstacle can accurately be recognized being unnecessary), thereby considerably reducing a detection time as compared with a conventional apparatus.

According to the second aspect of the present invention, there is provided a driving environment surveillance apparatus which limits a region specified by an image processing region limiting unit according to a distance detected by an obstacle detecting unit, and derives a two-dimensional image corresponding to the limited region from the image processing region limiting unit.

As stated above, in the driving environment surveillance apparatus according to the second aspect of the present invention, a correcting unit is provided to limit the region specified by the image processing region limiting unit according to the distance detected by the obstacle detecting unit, and derive a two-dimensional image corresponding to the limited region from the image processing region limiting unit, thereby more reducing a processing time in an obstacle extracting unit on a subsequent stage than would be in the first aspect of the present invention.

According to the third aspect of the present invention, there is provided a driving environment surveillance apparatus which predicts an amount of movement of an obstacle depending upon a distance and an azimuth currently detected by a first driving environment output unit and previously detected distance and azimuth, and specifies a position where the obstacle is present in a real spacial coordinate with respect to a driving road of a vehicle depending upon the distance and the azimuth currently detected by the first driving environment output unit so as to display a figure indicating a size index and the amount of movement of the obstacle at the specified positions.

As stated above, in the driving environment surveillance apparatus according to the third aspect of the present invention, a predicting unit is provided to predict the amount of movement of the obstacle depending upon the distance and the azimuth currently detected by the first driving environment output unit and the previously detected distance and azimuth, and a second driving environment output unit is provided to specify the position where the obstacle is present in the real spacial coordinate with respect to the driving road of the vehicle depending upon the distance and the azimuth currently detected by the first driving environment output unit so as to display the figure indicating the size index and the amount of movement of the obstacle at the specified position. It is thereby possible to enable a driver to recognize to what extent the obstacle will move.

According to the fourth aspect of the present invention, there is provided a driving environment surveillance apparatus which indicates a size index and an amount of movement of an obstacle by sizes of circles, respectively, and indicates one of the circles representing the amount of movement by a concentric circle positioned on an outer periphery of the other one of the circles representing the size index of the obstacle.

As stated above, in the driving environment surveillance apparatus according to the fourth aspect of the present invention, a driving environment output unit is provided to indicate the size index and the amount of movement of the obstacle by the size of the circle, and indicate the circle representing the amount of movement by the concentric circle positioned on the outer periphery of the circle representing the size index of the obstacle. As a result, it is possible to enable a driver to easily and intuitively recognize the size and so forth of the obstacle.

According to the fifth aspect of the present invention, there is provided a driving environment surveillance apparatus which predicts an amount of movement and a movement direction of an obstacle depending upon a distance and an azimuth currently detected by a first driving environment output unit and previously detected distance and azimuth, and specifies one position where the obstacle is present depending upon the distance and the azimuth currently detected by the first driving environment output unit and the other position where the obstacle will be present after the movement depending upon the amount of movement and the movement direction in a real spacial coordinate with respect to a driving road of a vehicle so as to display a figure indicating a size index of the obstacle at the one position where the obstacle is present and another figure indicating the amount of movement at the other position where the obstacle will be present after the movement.

As stated above, in the driving environment surveillance apparatus according to the fifth aspect of the present invention, a predicting unit is provided to predict the amount of movement and the movement direction of the obstacle depending upon the distance and the azimuth currently detected by the first driving environment output unit and the previously detected distance and azimuth, and a second driving environment output unit is provided to specify the one position where the obstacle is present depending upon the distance and the azimuth currently detected by the first driving environment output unit and the other position where the obstacle will be present after the movement depending upon the amount of movement and the movement direction in a real spacial coordinate with respect to the driving road of the vehicle so as to display the figure indicating the size index of the obstacle at the one position where the obstacle is present and another figure indicating the amount of movement at the other position where the obstacle will be present after the movement. It is thereby possible to enable a driver to recognize to which direction and to what extent the obstacle will move.

According to the sixth aspect of the present invention, there is provided a driving environment surveillance apparatus which indicates a size index and an amount of movement of an obstacle by sizes of circles, respectively, and indicates a line which could be a common tangent line for each circle.

As stated above, in the driving environment surveillance apparatus according to the sixth aspect of the present invention, a driving environment output unit is provided to indicate the size index and the amount of movement of the obstacle by the sizes of the circles, respectively, and indicate the line which could be the common tangent line for each circle. As a result, it is possible to enable a driver to easily and intuitively recognize the size, the movement direction and so forth of the obstacle.

According to the seventh aspect of the present invention, there is provided a driving environment surveillance apparatus which indicates a size index of an obstacle by a three-dimensional figure having a size according to the index.

As stated above, in the driving environment surveillance apparatus according to the seventh aspect of the present invention, a driving environment output unit is provided to indicate the size index of the obstacle by the three-dimensional figure having the size according to the index. As a result, it is possible to enable a driver to easily and intuitively recognize the size of the obstacle.

According to the eighth aspect of the present invention, there is provided a driving environment surveillance apparatus which indicates a size index and an amount of movement of an obstacle by a three-dimensional figure having a size according to the index and the amount of movement.

As stated above, in the driving environment surveillance apparatus according to the eighth aspect of the present invention, a driving environment output unit is provided to indicate the size index and the amount of movement of the obstacle by the three-dimensional figure having the size according to the index and the amount of movement. As a result, it is possible to enable a driver to easily and intuitively recognize the size and so forth of the obstacle.

According to the ninth aspect of the present invention, there is provided a driving environment surveillance apparatus which extends a size index of an obstacle determined according to calculation in case the obstacle has a height greater than a width thereof.

As stated above, in the driving environment surveillance apparatus according to the ninth aspect of the present invention, an obstacle extracting unit is provided to extend the size index of the obstacle determined according to the calculation in case the obstacle has the height greater than the width thereof. As a result, it is possible to indicate an obstacle which is small but may be seriously dangerous in a large size.

According to the tenth aspect of the present invention, there is provided a driving environment surveillance apparatus which refers to a size index of an obstacle preset according to a distance to the obstacle in case the distance and an azimuth to the obstacle are detected by an obstacle detecting unit, and an obstacle extracting unit outputs no size index of the obstacle, and outputs the size index of the obstacle corresponding to the distance detected by the obstacle detecting unit to a driving environment output unit.

As stated above, in the driving environment surveillance apparatus according to the tenth aspect of the present invention, an obstacle extracting auxiliary unit is provided to refer to the size index of the obstacle preset according to the distance to the obstacle in case the distance and the azimuth to the obstacle are detected by the obstacle detecting unit, and the obstacle extracting unit outputs no size index of the obstacle, and outputs the size index of the obstacle corresponding to the distance detected by the obstacle detecting unit to the driving environment output unit. As a result, it is possible to inform a driver of presence of the obstacle even if a temporary error should occur in image processing.

According to the eleventh aspect of the present invention, there is provided a driving environment surveillance apparatus which outputs, instead of a size index of an obstacle outputted from an obstacle extracting auxiliary unit, a substitution index having a greater value than that of the size index to a driving environment output unit in case an obstacle detecting unit detects a distance and an azimuth to the obstacle, and an obstacle extracting unit outputs no size index of the obstacle even after the elapse of a predetermined time or more from the detection of the distance and the azimuth.

As stated above, in the driving environment surveillance apparatus according to the eleventh aspect of the present invention, a data substituting unit is provided to output, instead of the size index of the obstacle outputted from the obstacle extracting auxiliary unit, the substitution index having a greater value than that of the size index to the driving environment output unit in case the obstacle detecting unit detects the distance and the azimuth to the obstacle, and the obstacle extracting unit outputs no size index of the obstacle even after the elapse of the predetermined time or more from the detection of the distance and the azimuth. As a result, it is possible to inform a driver of presence of the obstacle even if a temporary error should occur in image processing, and of potential of serious danger.

According to the twelfth aspect of the present invention, there is provided a driving environment surveillance apparatus in which, in case an obstacle detecting unit detects a distance and an azimuth to the obstacle, and an obstacle extracting unit does not output a size index of an obstacle even after the elapse of a predetermined time period or more from the detection of the distance and the azimuth, it is decided that any malfunction occurs to indicate the occurrence of the malfunction.

As stated above, in the driving environment surveillance apparatus according to the twelfth aspect of the present invention, a malfunction indicating unit is provided to decide that any malfunction occurs so as to indicate the occurrence of the malfunction in case the obstacle detecting unit detects the distance and the azimuth to the obstacle, and the obstacle extracting unit does not output the size index of the obstacle even after the elapse of the predetermined time period or more from the detection of the distance and the azimuth. It is thereby possible to inform a driver of occurrence of error in image processing.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

DETAILED DESCRIPTION OF THE PREFERRED EMBODIMENTS

Preferred embodiments of the invention will now be described in detail referring to the accompanying drawings.

Embodiment 1

A description will now be given of one embodiment of the present invention with reference to the drawings.

Figure 1:
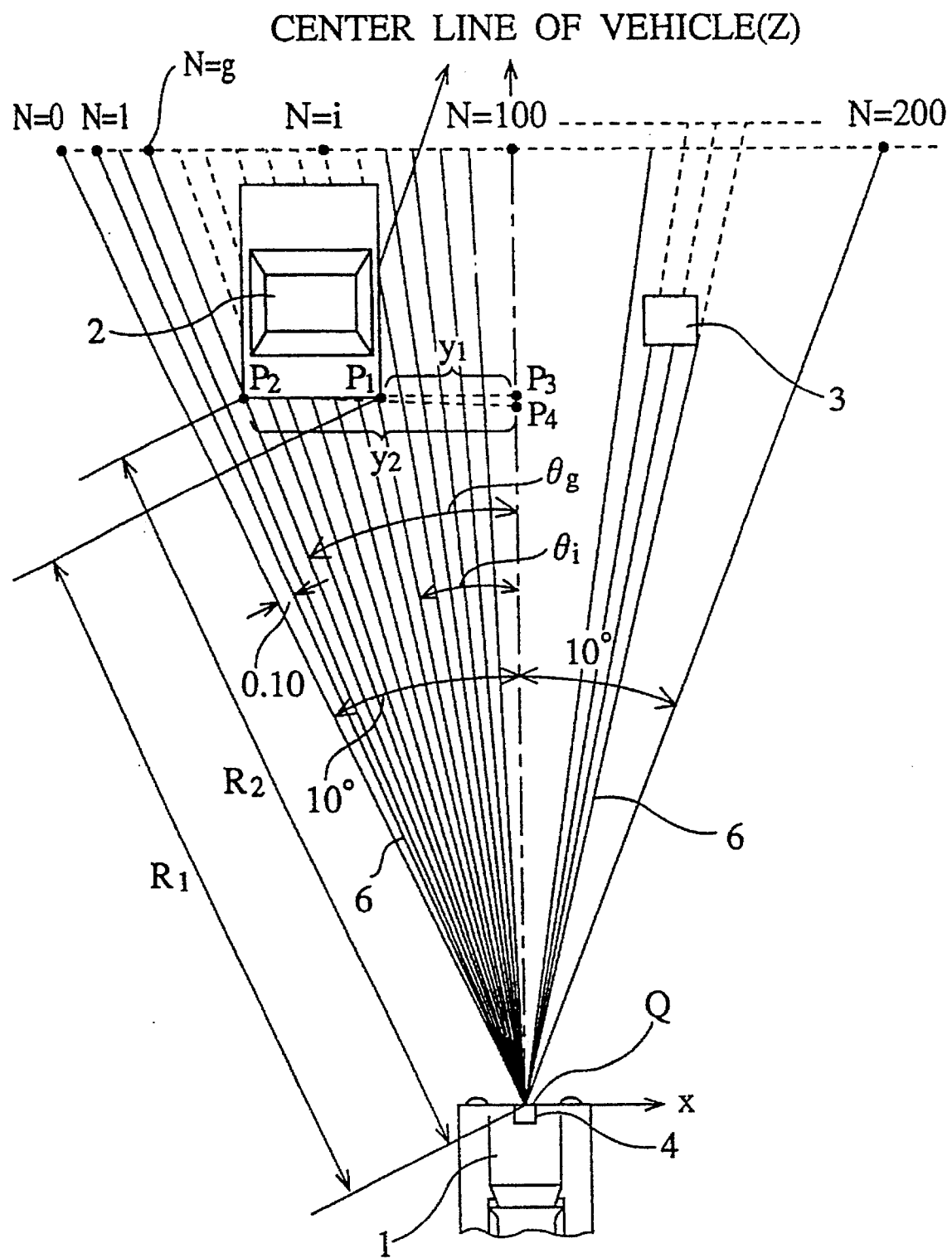
FIG. 1 is a plan view showing a conventional driving environment surveillance apparatus.
Figure 2:
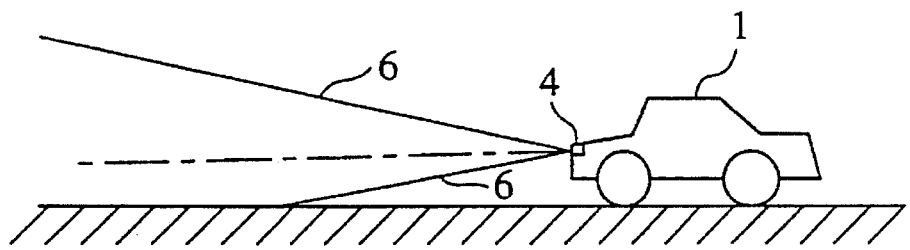
FIG. 2 is a sectional view showing the conventional driving environment surveillance apparatus.
Figure 3:
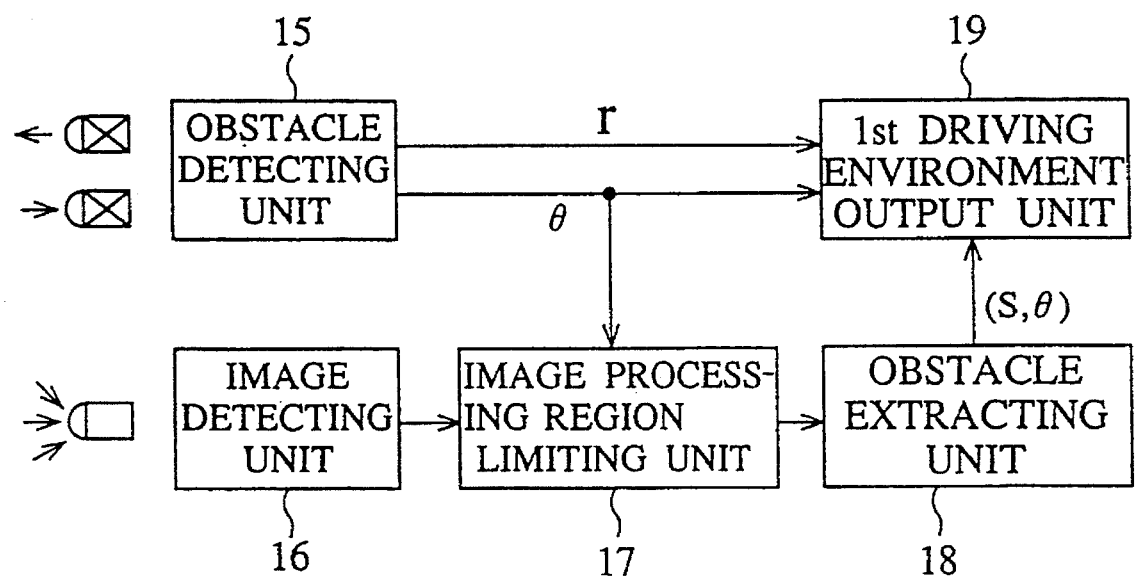
FIG. 3 is a block diagram showing a driving environment surveillance apparatus according to the embodiment 1 of the present invention.
Figure 4:
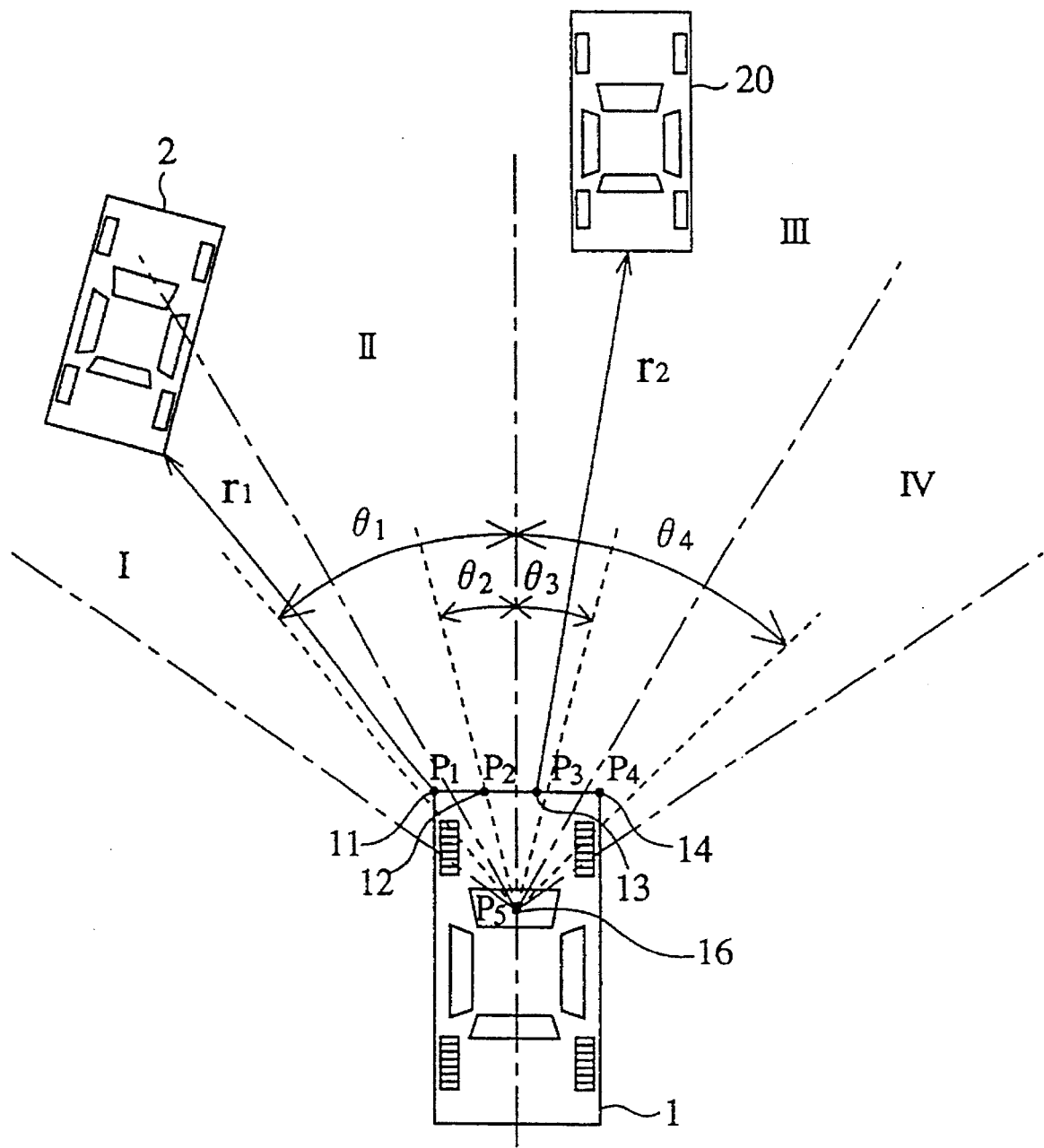
FIG. 4 is a plan view showing the driving environment surveillance apparatus according to the embodiment 1 of the present invention.

FIG. 3 is a block diagram showing a driving environment surveillance apparatus according to the embodiment 1 of the present invention, and FIG. 4 is a plan view showing the driving environment surveillance apparatus according to the embodiment 1 of the present invention. In the drawings, the same reference numerals are used for component parts identical with or equivalent to those in a conventional apparatus, and descriptions thereof are omitted.

Reference numerals 11 to 14 mean laser radars to scan any one of four divided peripheral regions I to IV in a travelling direction of a vehicle 1 so as to detect, if there are obstacles 2 and 20 in the scanning region, a relative distance and an azimuth from the vehicle 1 to the obstacles 2 and 20. The laser radars 11 to 14 are mounted on front portions $P_1$ to $P_4$ of the vehicle 1, and respectively correspond to the regions I, II, III, and IV. An obstacle detecting unit 15 includes the laser radars 11 to 14.

Reference numeral 16 means an image sensor (an image detecting unit) such as a CCD camera mounted on a position $P_5$ immediately before a driver seat of the vehicle 1, for detecting two-dimensional images of the peripheral regions I to IV, 17 is an image processing region limiting unit for specifying a region where the obstacles 2 and 20 are present depending upon azimuths $\theta_1$ to $\theta_4$ detected by the laser radars 11 to 14 so as to derive the two-dimensional image corresponding to the specified region from the image sensor 16, 18 is an obstacle extracting unit for extracting the obstacles 2 and 20 from the two-dimensional image provided by the image processing region limiting unit 17, and for calculating size indexes S of the obstacles 2 and 20, and 19 is a driving environment output unit for specifying positions where the obstacles 2 and 20 are present in a real spacial coordinate with respect to a driving road of the vehicle 1 based upon the distances and the azimuths detected by the laser radars 11 to 14 so as to display figures indicating the size indexes S of the obstacles 2 and 20 at the specified positions.

A description will now be given of the operation.

The laser radars 11 to 14 emit pulse-like laser light forward at a predetermined time interval, and receive the laser light reflected by the obstacles 2 and 20 as reflected light if the obstacles 2 and 20 are present in front of the vehicle to measure the reflection time so as to detect the distances to the obstacles 2 and 20. Referring to FIG. 4, the obstacle 2 is present in the regions I and II, and the obstacle 20 is present in the region III. Hence, the laser radars 11, 12, and 13 can receive the reflected light and the laser radar 14 receives no reflected light.

The laser radars 11 to 14 are mounted for each region so that the laser radar 11 outputs the azimuth $\theta_1$ representative of the region I an azimuth signal when the laser radar 11 detects the obstacle. Accordingly, in case of FIG. 4, the laser radars 11, 12, and 13 output respective azimuth signals $\theta_1$, $\theta_2$, and $\theta_3$ since the laser radars 11 to 13 detect the obstacles.

Figure 5:
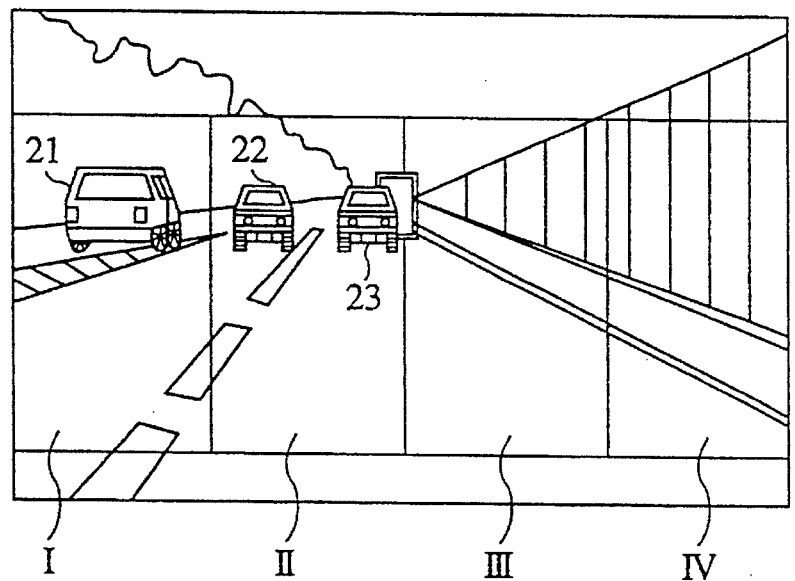
FIG. 5 is an explanatory view illustrating presence of obstacles.

For purpose of more specific discussion, a description will now be given of the operation with reference to a condition in front of the vehicle 1 as shown in FIG. 5. In FIG. 5, reference numerals 21 to 23 mean other vehicles corresponding to obstacles.

Referring to FIG. 5, the obstacles 21 to 23 are present in the regions I and II so that the laser radars 11 and 12 receive the reflected light (the laser radars 13 and 14 receiving no reflected light because the obstacles 21 to 23 are absent in the regions III and IV).

Therefore, the laser radars 11 and 12 measure the reflection times to determine the distances to the obstacles 21 to 23 so as to output signals indicating distances $r_1$, $r_2$, and $r_3$ and the azimuths $\theta_1$ and $\theta_2$.

Further, the image processing region limiting unit 17 receives the signals indicating the azimuths $\theta_1$ and $\theta_2$ from the laser radars 11 and 12, thereby recognizing the presence of the obstacle 21 in the region I, and the presence of the obstacles 22 and 23 in the region II.

Figure 6:
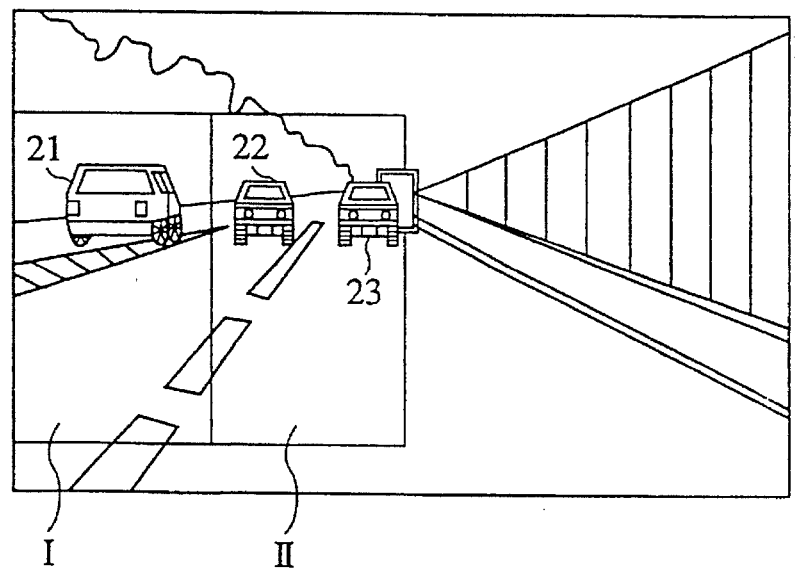
FIG. 6 is an explanatory view illustrating the presence of the obstacles.

Two-dimensional images in the regions I to IV are imaged by the image sensor 16. The image processing region limiting unit 17, however, derives only the two-dimensional images corresponding to the regions I and II from the image sensor 16 (see FIG. 6) since no obstacle is present in the regions III and IV. Thereafter, the image processing region limiting unit 17 outputs the two-dimensional images corresponding to the regions I and II to the obstacle extracting unit 18 on a subsequent stage. This is because the obstacle extracting unit 18 is operated to extract obstacles, and obstacle extracting processing becomes unnecessary in the region where any obstacle is not present absolutely.

Subsequently, the obstacle extracting unit 18 extracts the obstacles 21 to 23 from the two-dimensional images corresponding to the regions I and II, and calculates the size indexes S of the obstacles 21 to 23. In this case, the obstacles 21 to 23 are extracted by well-known image processing (i.e., basic image processing such as edge detection, or line connection), and a brief description will be given of the image processing hereinafter while a detailed description thereof is omitted.

In the image processing, the two-dimensional image is differentiated in horizontal and vertical directions for the edge extraction, and thereafter each vicinal point is connected to each other (line connection) in the extracted edge to provide a visible outline of an object so as to regard the outline as the obstacle.

In order to decide a kind of the obstacle, there is provided an extraction frame corresponding to an outside dimension of, for example, the vehicle at a position where the obstacle such as the vehicle may be present based upon the distance data provided from the laser radars 11 to 14. If the extraction frame is matched with the outline of the object, the outline of the object can be regarded as the obstacle such as the vehicle. Otherwise, the outline is regarded as a background object or the other obstacle such as a road object.

Figure 7A:
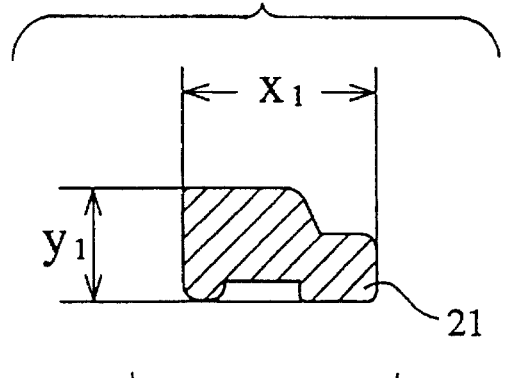
FIG. 7 is an outline diagram showing outlines of the obstacles.
Figure 7B:
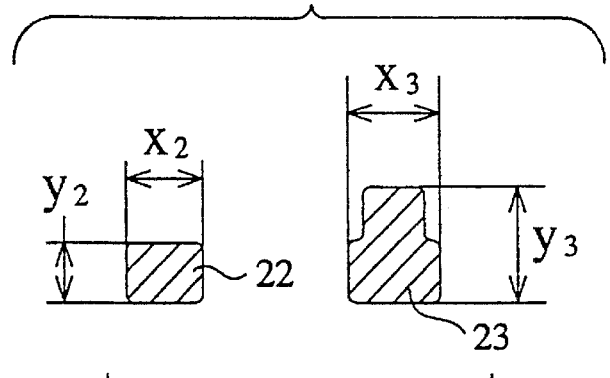

On the other hand, the outlines of the obstacles 21 to 23 are provided as shown in FIG. 7 by the image processing, and the size index S of the obstacle can be calculated by each width x and height y of the obstacles 21 to 23. That is, the size index $S_1$ of the obstacle 21, the size index $S_2$ of the obstacle 22, and the size index $S_3$ of the obstacle 23 can be expressed as follows:

$$S_1 = \sqrt{(x_1^2 + y_1^2)} \quad (3)$$

$$S_2 = \sqrt{(x_2^2 + y_2^2)} \quad (4)$$

-continued $$S_3 = \sqrt{(x_3^2 + y_3^2)} \quad (5)$$

As described above, the obstacle extracting unit 18 calculates the size indexes $S_1$, $S_2$, and $S_3$ of the obstacles 21 to 23, and outputs them to the driving environment output unit 19. Therefore, the driving environment output unit 19 can specify the position where the obstacles 21 to 23 are present in the zeal spacial coordinate with respect to the driving road of the vehicle 1 depending upon the distances $r_1$, $r_2$, and $r_3$ and the azimuths $\theta_1$ and $\theta_2$ detected by the laser radars 11 and 12 (see FIG. 8).

In this case, since there is only one obstacle in the region I, the position of the obstacle 21 can be specified by the distance $r_1$ and the azimuth $\theta_1$. On the other hand, there are two obstacles in the region II so that the driving environment output unit 19 decides a lateral relation between the positions of the obstacles 22 and 23 depending upon the two-dimensional image outputted from the image sensor 16, and specifies the positions of the obstacles 22 and 23 based upon the resultant decision and the distances $r_2$ and $r_3$ to the obstacles 22 and 23.

Figure 8:
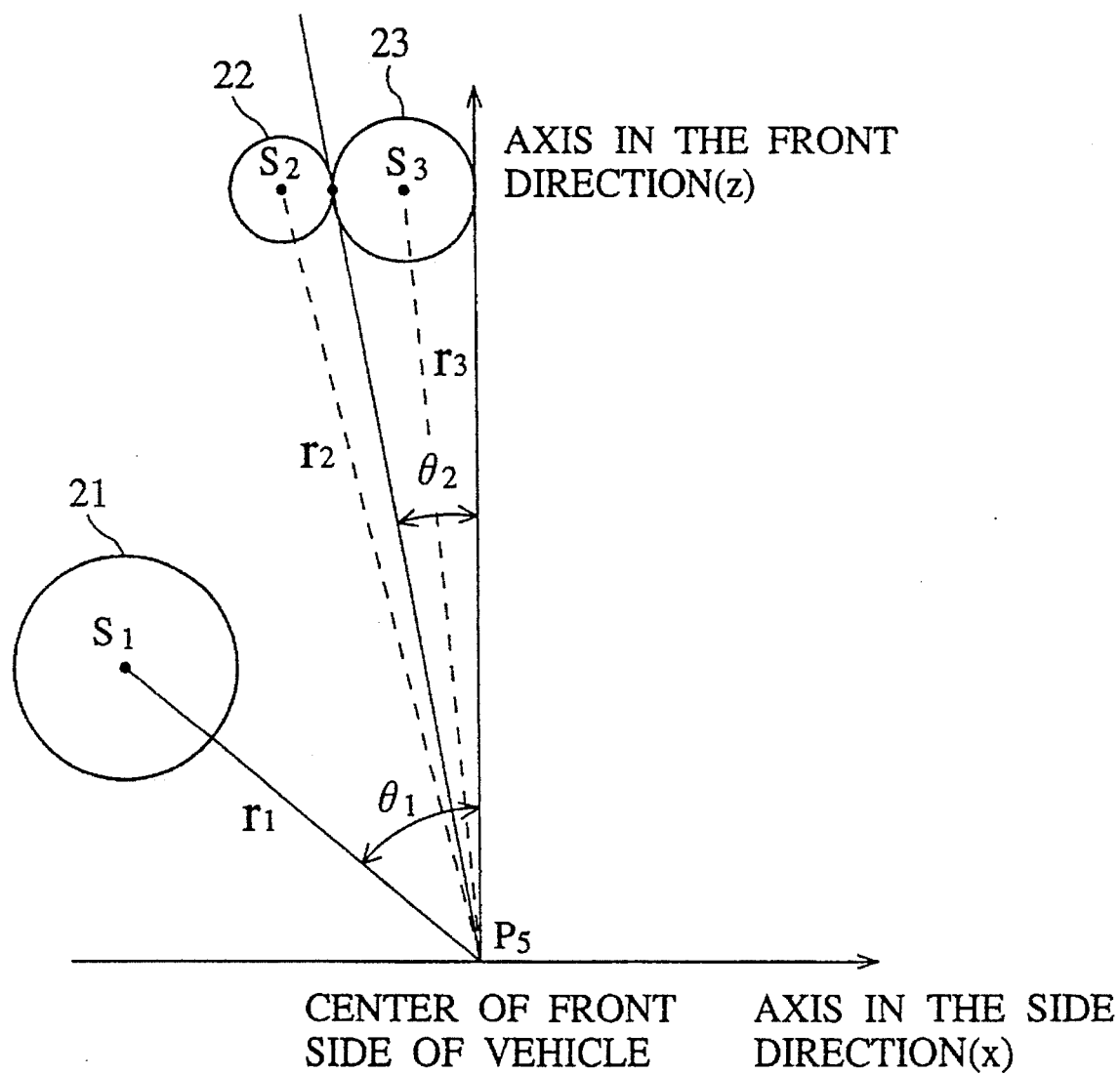
FIG. 8 is a display view showing the presence of the obstacles.

Finally, as shown in FIG. 8, the driving environment output unit 19 indicates circles having radii proportional to the size indexes $S_1$ to $S_3$ of the obstacles 21 to 23 extracted by the obstacle extracting unit 18 at the specified positions.

Thereby, a driver can recognize the positions and the sizes of the obstacles 21 to 23.

In the embodiment 1, it is possible to perform the image processing at a high speed, and provide real-time processing since the image processing region is limited. In case a major problem occurs in a real-time performance due to a long time required for the image processing, the peripheral region may further be divided into six regions or eight regions rather than four regions so as to reduce an amount of the two-dimensional image to be processed by the image processing. It is thereby possible to provide higher speed image processing without any problem in the real-time performance.

Embodiment 2

The embodiment 1 has been described with reference to an obstacle detecting unit 15 including four laser radars 11 to 14 which are mounted at predetermined positions. Alternatively, one laser radar may be mounted to have a wider scanning area than that of the laser radars 11 to 14.

In this case, it is also unnecessary to scan at a fine and highly accurate angle unlike a conventional embodiment, and a scanning region may be divided into four regions as in the embodiment 1 or about eight regions. In this connection, no problem occurs in a real-time performance if the scanning is performed at a speed in which all regions can be processed for an interval of about 10 ms or less.

Embodiment 3

Figure 9:
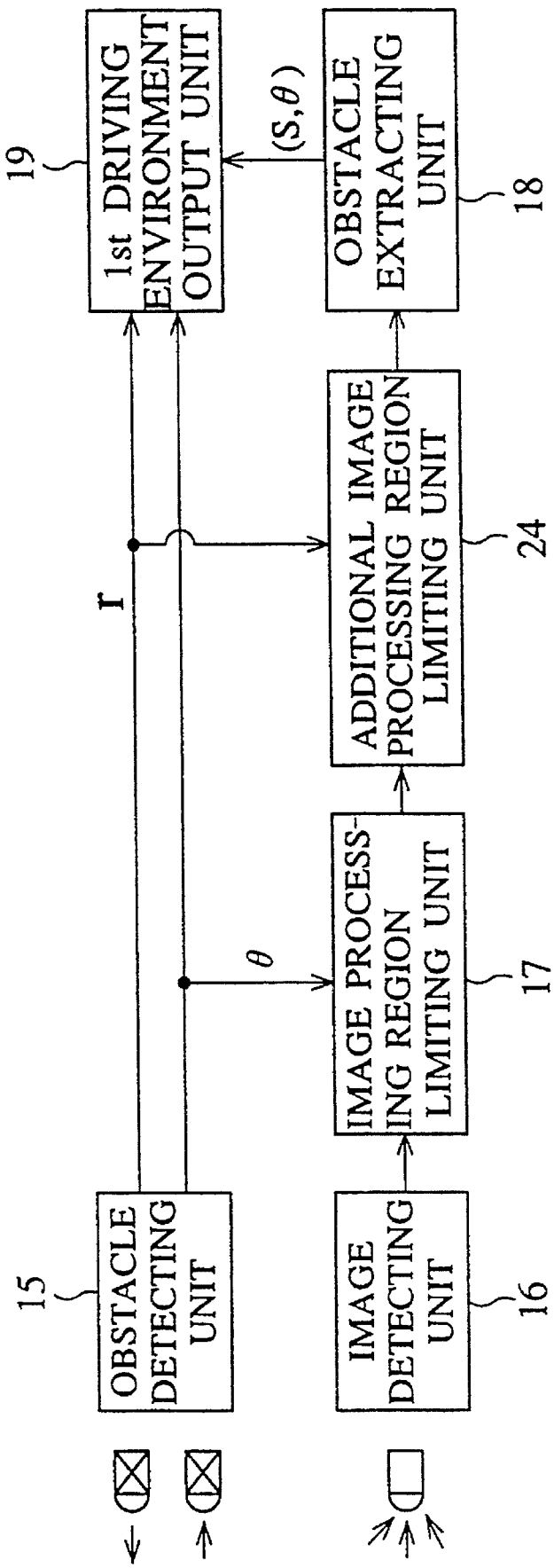
FIG. 9 is a block diagram showing a driving environment surveillance apparatus according to the embodiment 3 of the present invention.

FIG. 9 is a block diagram showing a driving environment surveillance apparatus according to the embodiment 3 of the present invention. In the drawing, reference numeral 24 means an additional image processing region limiting unit for limiting a region specified by an image processing region limiting unit 17 according to a distance detected by laser radars 11 to 14 (i.e., an obstacle detecting unit 15), and for deriving a two-dimensional image corresponding to the limited region from the image processing region limiting unit 17.

A description will now be given of the operation.

Figure 10:
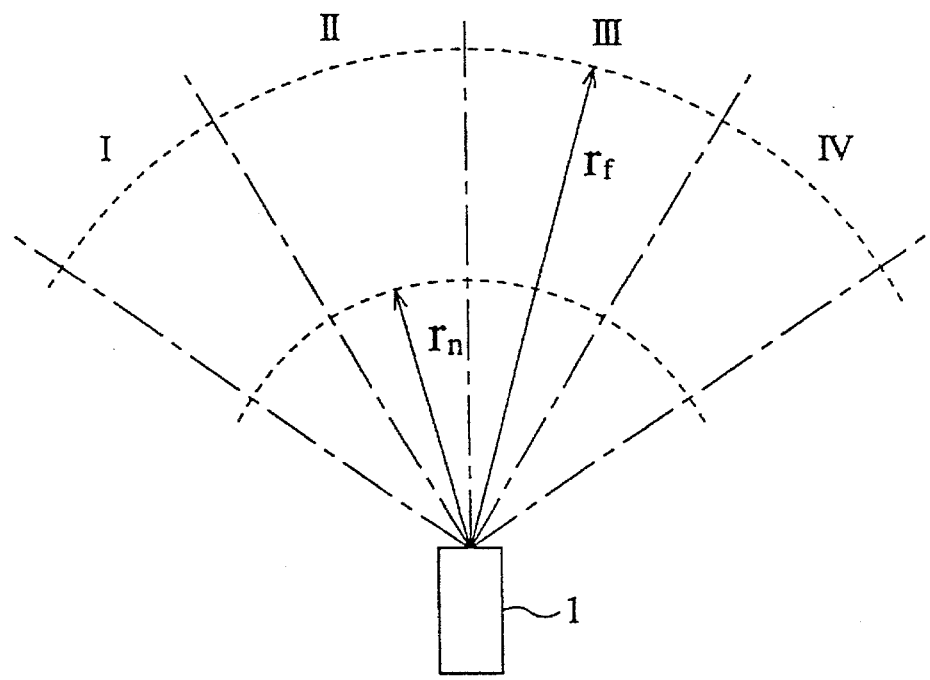
FIG. 10 is a plan view illustrating positions where obstacles are present.

As shown in FIG. 10, the laser radar 12 detects presence of an obstacle in a region II at a position separated by a distance $r_n$, and the laser radar 13 detects presence of another obstacle in a region III at a position separated by a distance $r_f$.

Figure 11:
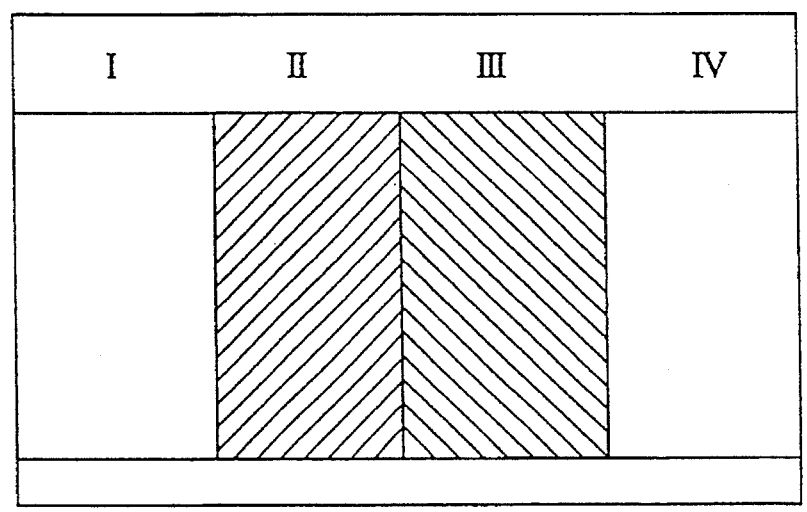
FIG. 11 is an explanatory view showing regions to derive two-dimensional images.

Thereby, the image processing region limiting unit 17 derives two-dimensional images in the regions II and III, that is, the two-dimensional images corresponding to the shaded portions in FIG. 11 from an image sensor 16.

Figure 12:
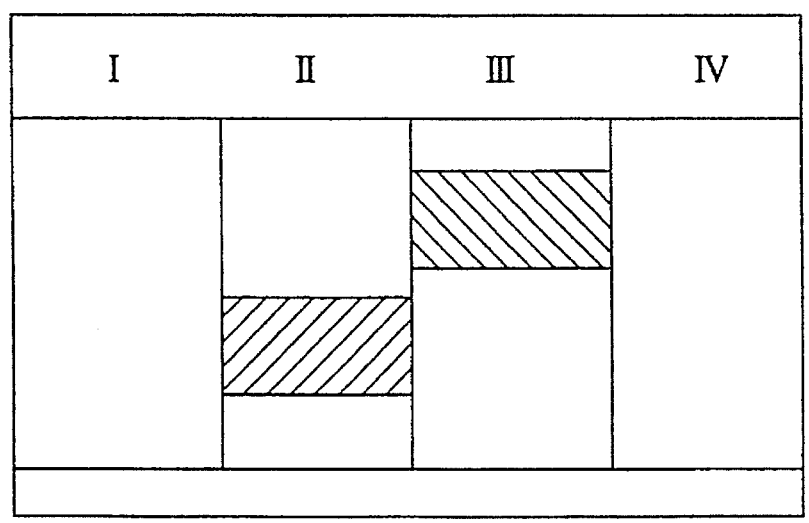
FIG. 12 is an explanatory view showing the regions to derive the two-dimensional images.

Then, the additional image processing region limiting unit 24 derives the two-dimensional images corresponding to the shaded portions in FIG. 12 from the image processing region limiting unit 17 according to the detected distances $r_n$ and $r_f$.

That is, the two-dimensional images can be reduced since it is possible to detect approximate positions where the obstacles are present depending upon the detected distances $r_n$ and $r_f$. By the reduction, it is possible to discover the obstacles by simply performing the image processing for only peripheral portions separated by the distances $r_n$ and $r_f$ because the obstacles are present at the peripheral portions separated by the distances $r_n$ and $r_f$. It is thereby possible to provide higher speed image processing in the obstacle extracting unit 18 on a subsequent stage.

Embodiment 4

Figure 13:
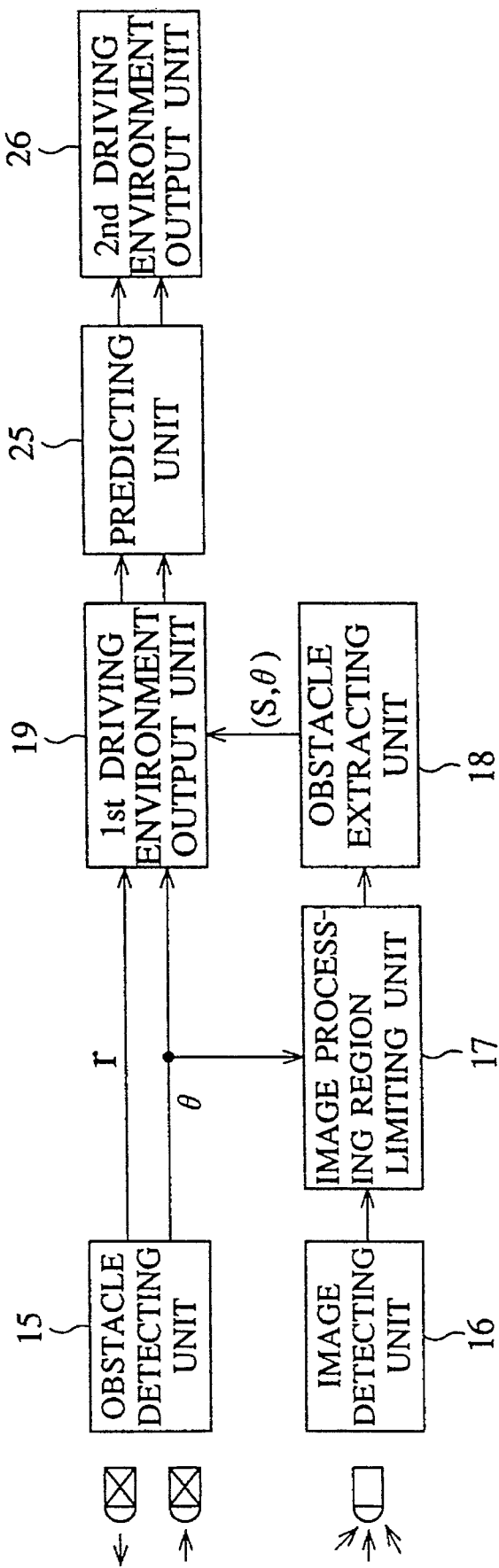
FIG. 13 is a block diagram showing a driving environment surveillance apparatus according to the embodiment 4 of the present invention.

FIG. 13 is a block diagram showing a driving environment surveillance apparatus according to the embodiment 4 of the present invention. In the drawing, reference numeral 25 means a predicting unit for predicting an amount $S_D$ of movement of an obstacle depending upon a distance and an azimuth currently detected by laser radars 11 to 14 and another distance and another azimuth previously detected, and 26 is a driving environment output unit for displaying a figure indicating the amount $S_D$ of movement of the obstacle at a position specified by a driving environment output unit 19.

A description will now be given of the operation.

Component parts other than the predicting unit 25 and the driving environment output unit 26 are identical with those described in the embodiment 1, and descriptions of the their operation are omitted. For purpose of simplicity, a description will now be given of a case where only an obstacle 21 is present as the present obstacle.

Figure 14A:
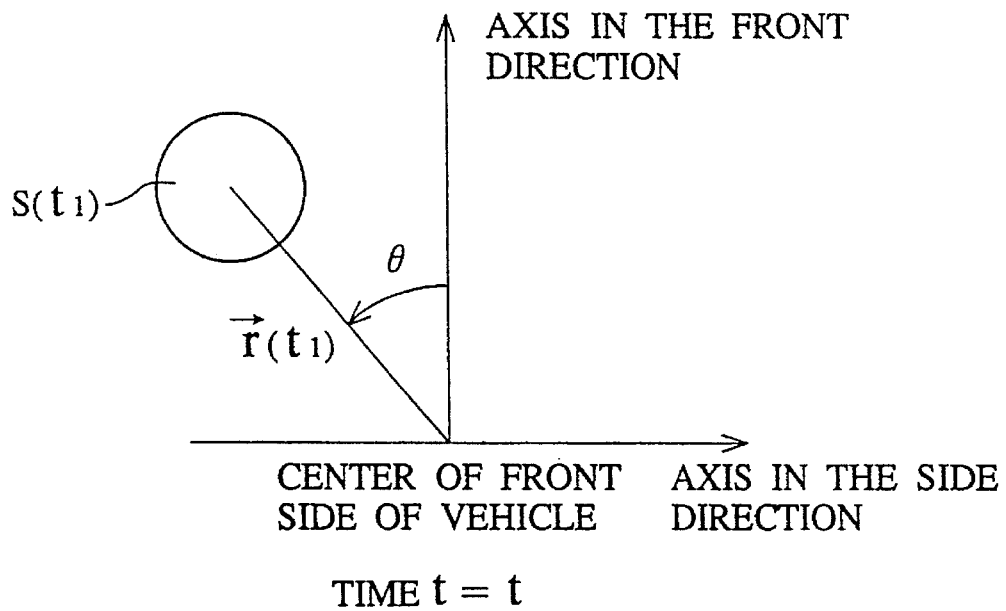
FIG. 14A is a display view showing the presence of the obstacle.

Since only the obstacle 21 serves as the present obstacle as set forth above, it is assumed that the driving environment output unit 19 displays a figure as shown in FIG. 14A.

Figure 15:
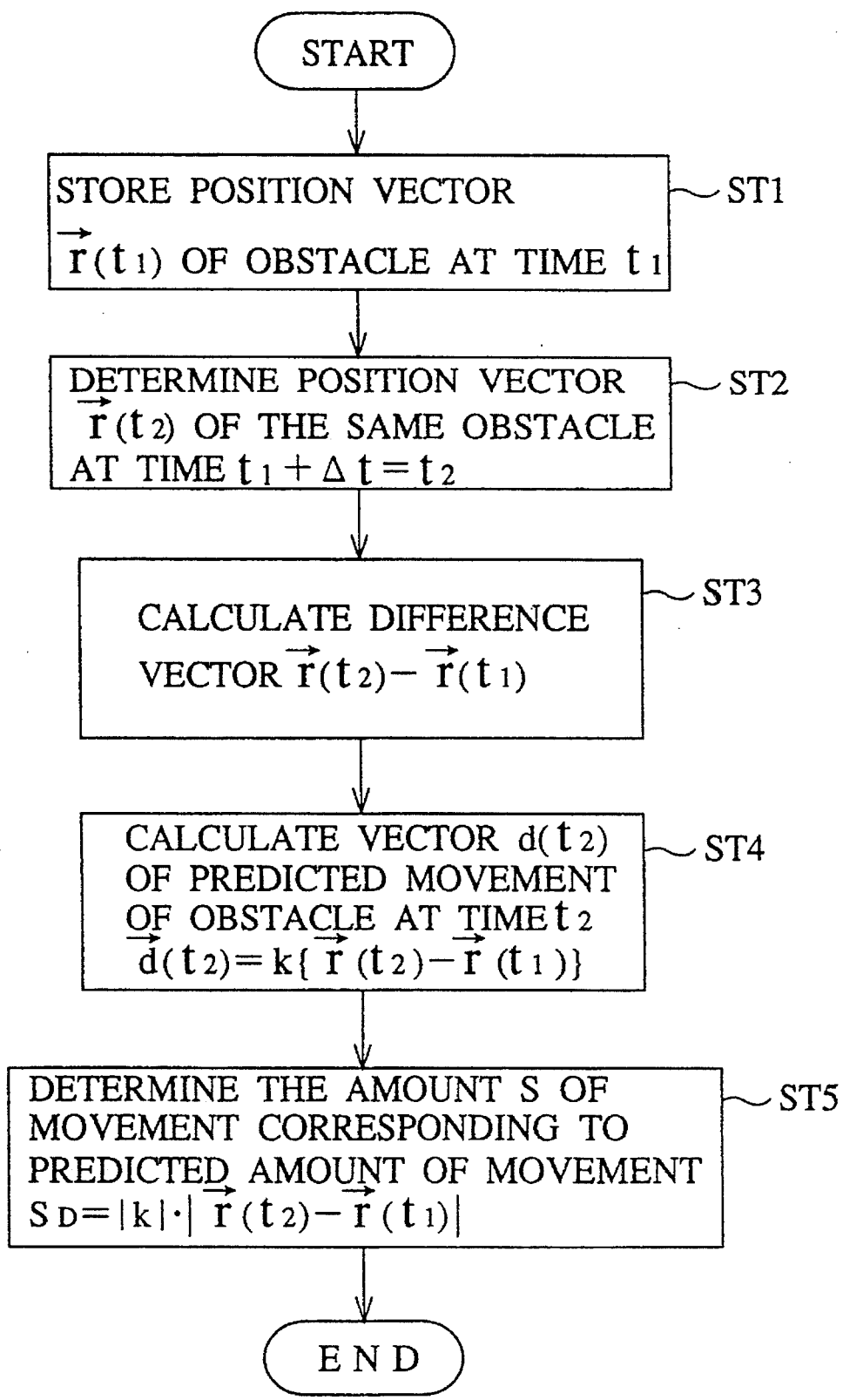
FIG. 15 is a flowchart diagram showing the operation of the driving environment surveillance apparatus according to the embodiment 4 of the present invention.

The predicting unit 25 stores a position of the obstacle 21 specified by the driving environment output unit 19 as a position vector $\vec{r}(t_1)$ ( hereinafter, each vector is expressed by a Gothic character for example $r(t_1)$) of the obstacle 21 at a time $t_1$ (Step ST1 in FIG. 15 ). In this connection, the position vector $r(t_1)$ is a position vector with a center of the front side of a vehicle as the origin, and can be specified by a distance $r(t_1)$ and an azimuth $\theta(t)$ to the obstacle 21 at the time $t_1$.

Figure 14B:
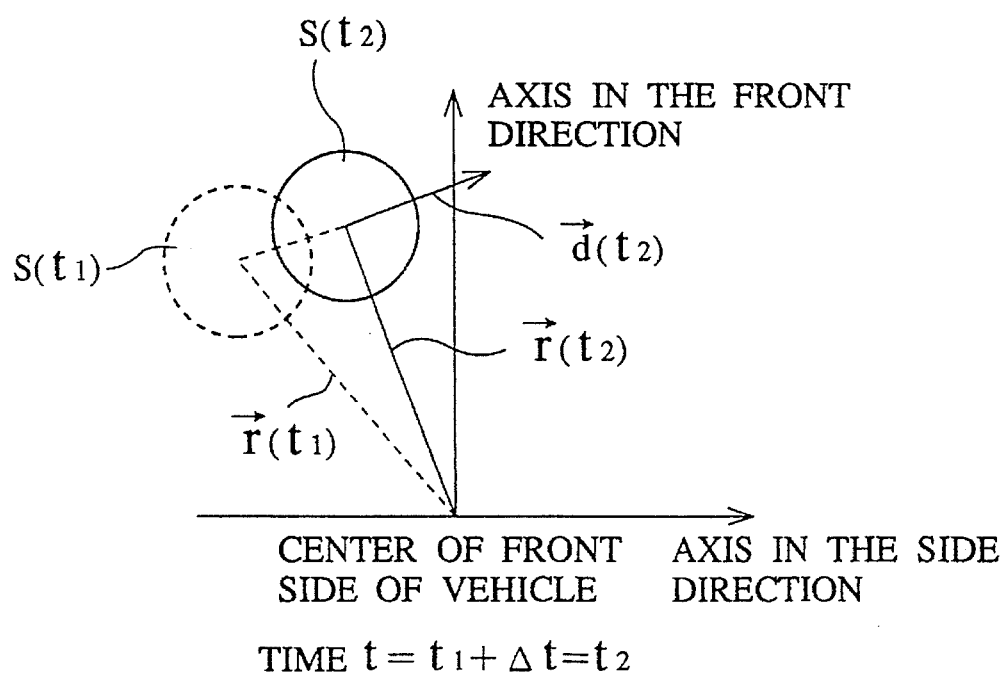
FIG. 14B is a display view showing the presence of the obstacle.

Subsequently, the predicting unit 25 derives a position of the obstacle at a time $t_2$ from the driving environment output unit 19 to define the position as the position vector $r(t_2)$ of the obstacle 21 at the time $t_2$ (Step ST2). Thus, the driving environment output unit 19 displays a figure as shown in FIG. 14B in which another figure is shown by the dotted line for illustrative purpose only, and is not displayed in actuality.

Figure 16:
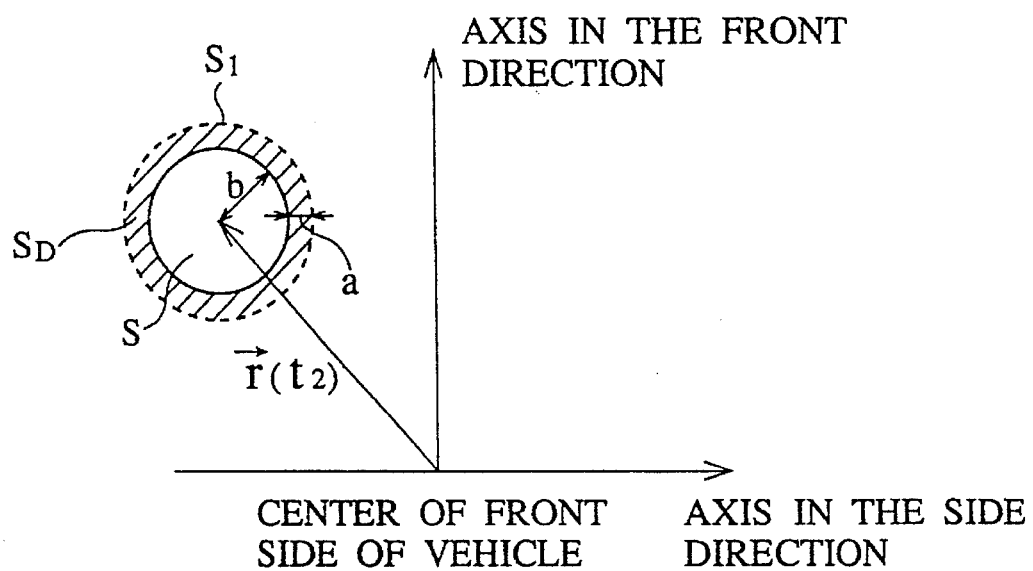
FIG. 16 is a display view showing the presence of the obstacle.

Finally, the predicting unit 25 determines a difference between the position vector $r(t_2)$ and the position vector $r(t_1)$ to determine a vector $d(t_2)$ of predicted movement (Steps ST3 and ST4), and determines an absolute value of the movement vector $d(t_2)$ to determine the amount $S_D$ of movement (Step ST5) as follows:

$$d(t_2)=k(r(t_2)-r(t_1))$$

$$S_D=|k|\cdot|(r(t_2)-r(t_1))|$$

where k is a constant. The determined amount $S_D$ of movement input into the driving environment output unit 26. As shown in FIG. 16, the driving environment output unit 26 adds a length a extending proportional to the amount $S_D$ of movement to a radius b of a circle extending proportional to a size index $S_1$ of the obstacle 21 so as to display the amount $S_D$ of movement as a concentric circle positioned on an outer periphery of the circle indicating the index $S_1$. Therefore, a radius $S^*$ of the circle indicating the amount $S_D$ of movement can be expressed as $S^*=a+b$.

Thereby, even in obstacles having the same size, as the obstacle moves more rapidly, the obstacle is displayed in a larger size so as to more easily decide whether or not the danger is serious.

Though the embodiment 4 has been described with reference to a case at the times $t_1$ and $t_2$, in actuality, the same process is repeated for each time $\Delta t$ to determine a vector $d(t)$ of predicted movement and the amount $S_D$ of movement at each time so as to display concentric circles.

Embodiment 5

Figure 17:
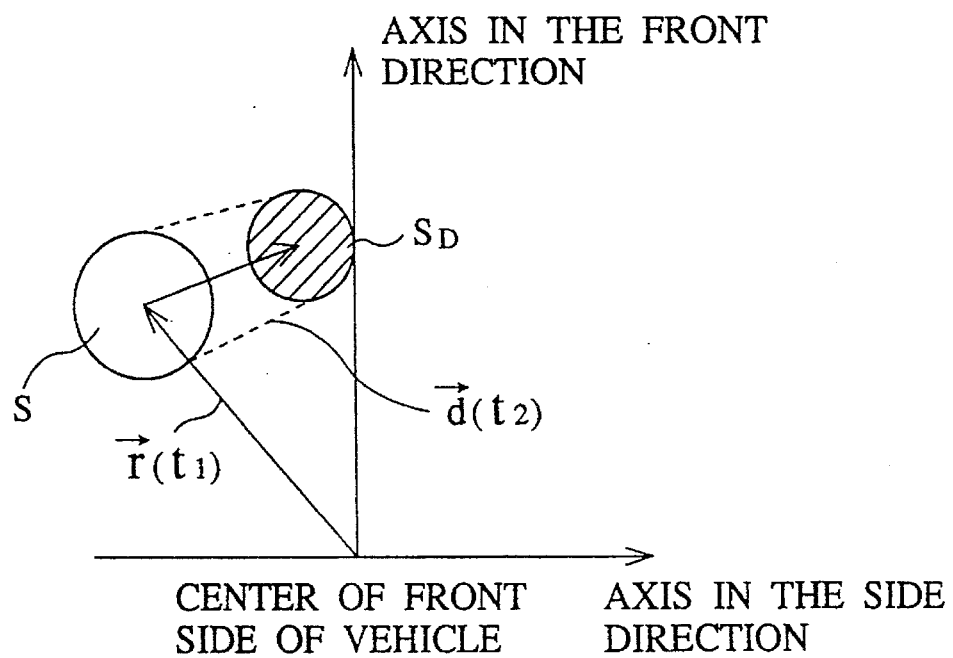
FIG. 17 is a display view showing the presence of the obstacle.

The embodiment 4 has been described with reference to a case where a circle indicating an amount $S_D$ of movement is displayed as a concentric circle positioned on an outer periphery of a circle indicating a size index of an obstacle. However, as shown in FIG. 17, a predicted position of an obstacle 21 at a time $t_3$ may be specified according to a vector $d(t_2)$ of predicted movement and the amount $S_D$ of movement determined by a predicting unit 25, and a circle having a radius extending proportional to the amount $S_D$ of movement may be displayed at the position.

In the drawing, the dotted lines display each common tangent line for each circle for purpose of indicating a movement direction.

According to the embodiment 5, it is thereby possible to decide the degree of danger in the movement direction of the obstacle.

Embodiment 6

Figure 18:
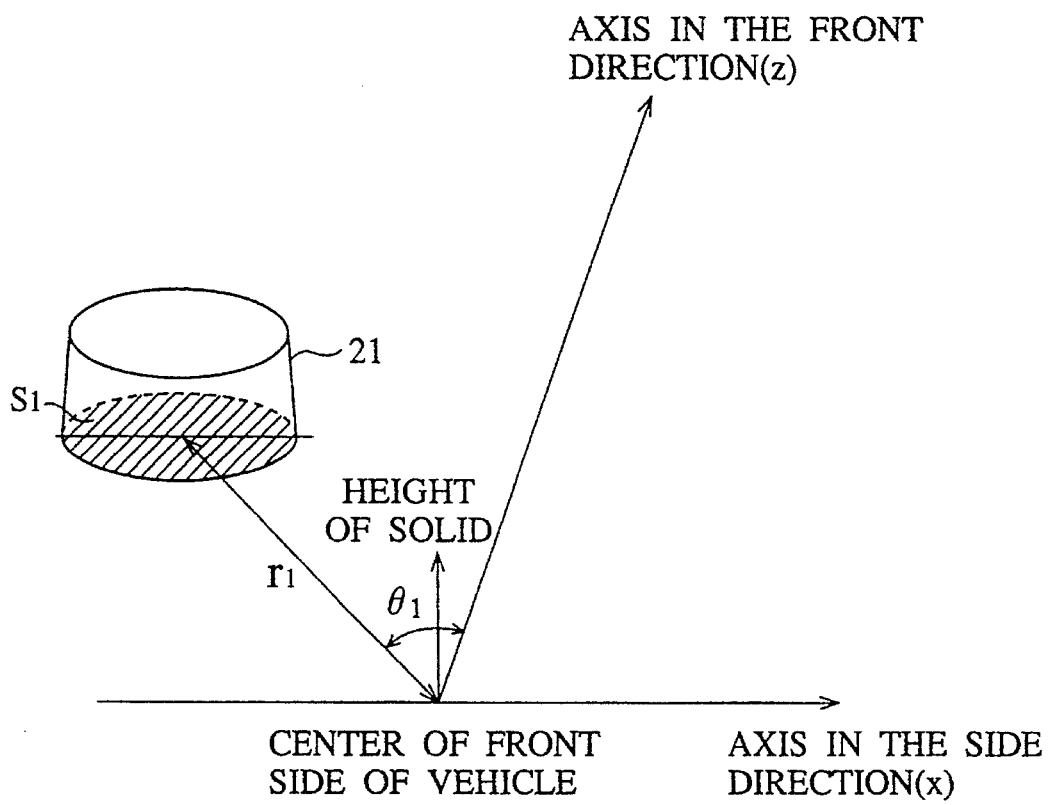
FIG. 18 is a display view showing the presence of the obstacle.

The embodiment 5 has been described with reference to a case where a size index of an obstacle is indicated by a size of a circle. However, as shown in FIG. 18, the size index $S_1$ of the obstacle may be indicated by a size of a bottom area of a column.

Thus, there are advantages in that it is possible to provide a stereoscopic vision, and more facilitate grasp of a total image of a running environment than would be in the above embodiment.

In this case, coordinate axes (corresponding to axes in a front direction and in a side direction of a vehicle) do not intersect mutually at right angle, but diagonally intersect.

Embodiment 7

Figure 19:
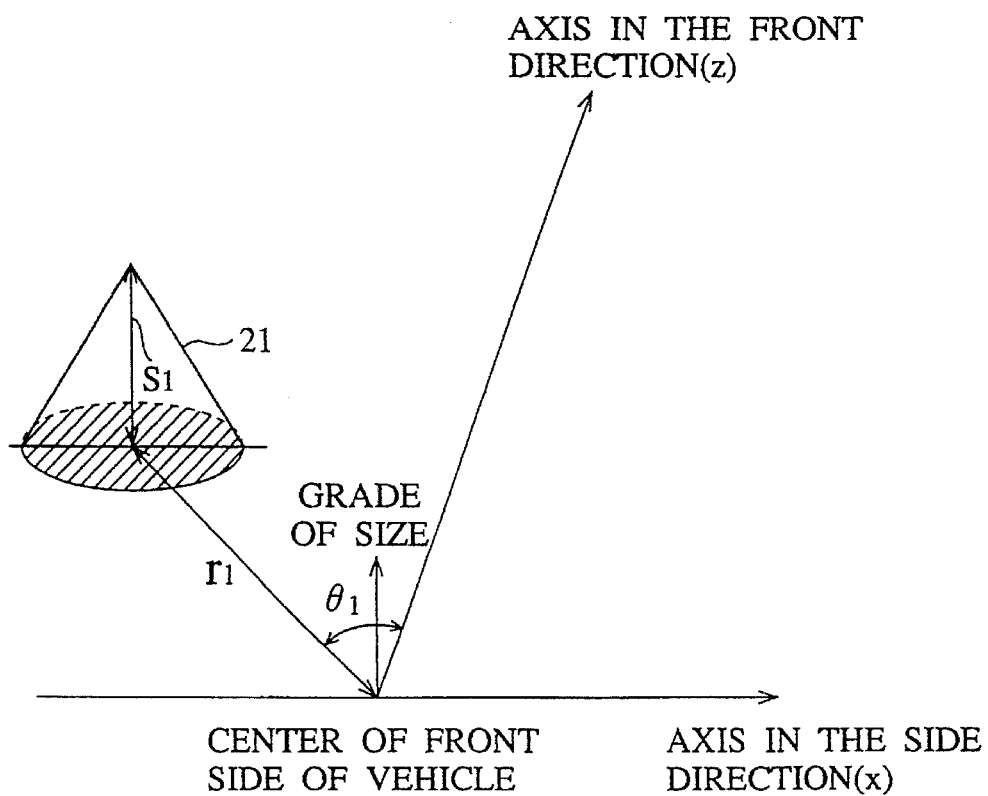
FIG. 19 is a display view showing the presence of the obstacle.
Figure 20:
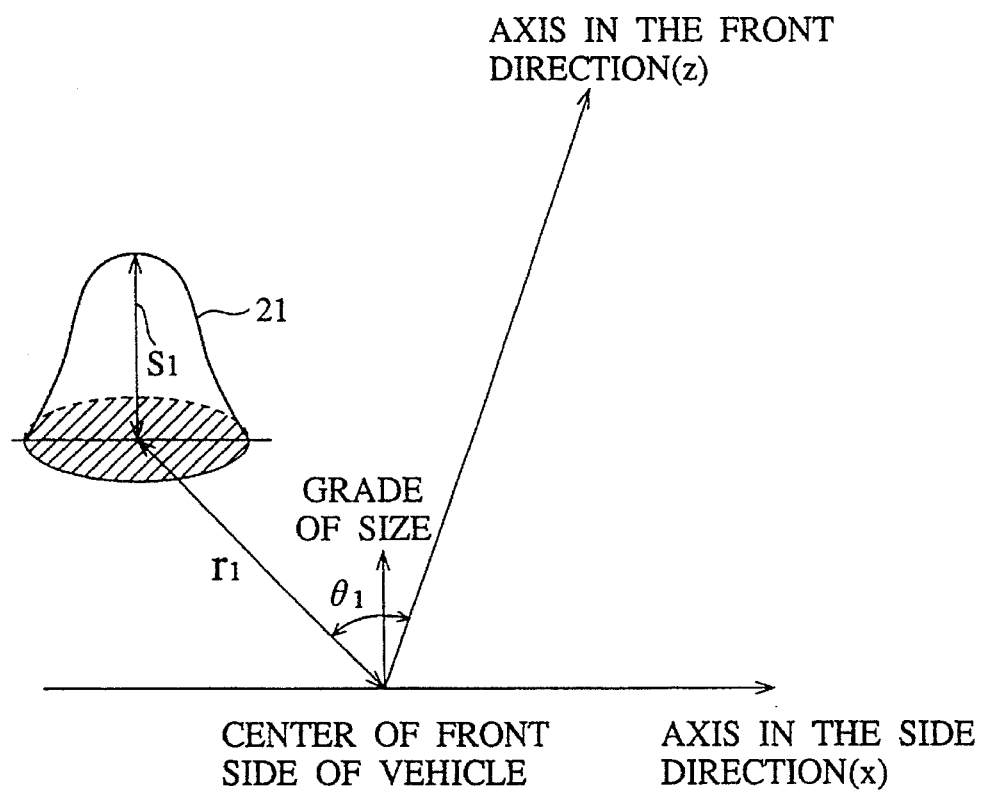
FIG. 20 is a display view showing the presence of the obstacle.

The embodiment 6 has been described with reference to a case where a size index $S_1$ of an obstacle is indicated by a bottom area size of a column. However, as shown in FIGS. 19 and 20, the size index $S^1$ of the obstacle may be indicated by a circular cone or a campanulate form having the size index $S_1$ as a height.

Since the size index $S_1$ of the obstacle corresponds to the height as set forth above, there are advantages in that it is possible to more clarify a visual difference of the index $S_1$, and facilitate a total image of a running environment. Further, it is possible to enhance possibility of displaying a distant obstacle without being shaded by a near obstacle.

Though the embodiment 7 has been described with reference to the circular cone or the campanulate form, the present invention may employ any desired form which can indicate the size index $S_1$ of the obstacle in three dimensions.

Embodiment 8

The embodiments 6 and 7 have been described with reference to a case where a three-dimensional figure is displayed based upon a size index $S_1$ of an obstacle. However, as shown in FIGS. 21 to 24, the three-dimensional figure may be displayed based upon the size index $S_1$ and an amount $S_D$ of movement of the obstacle.

Figure 21:
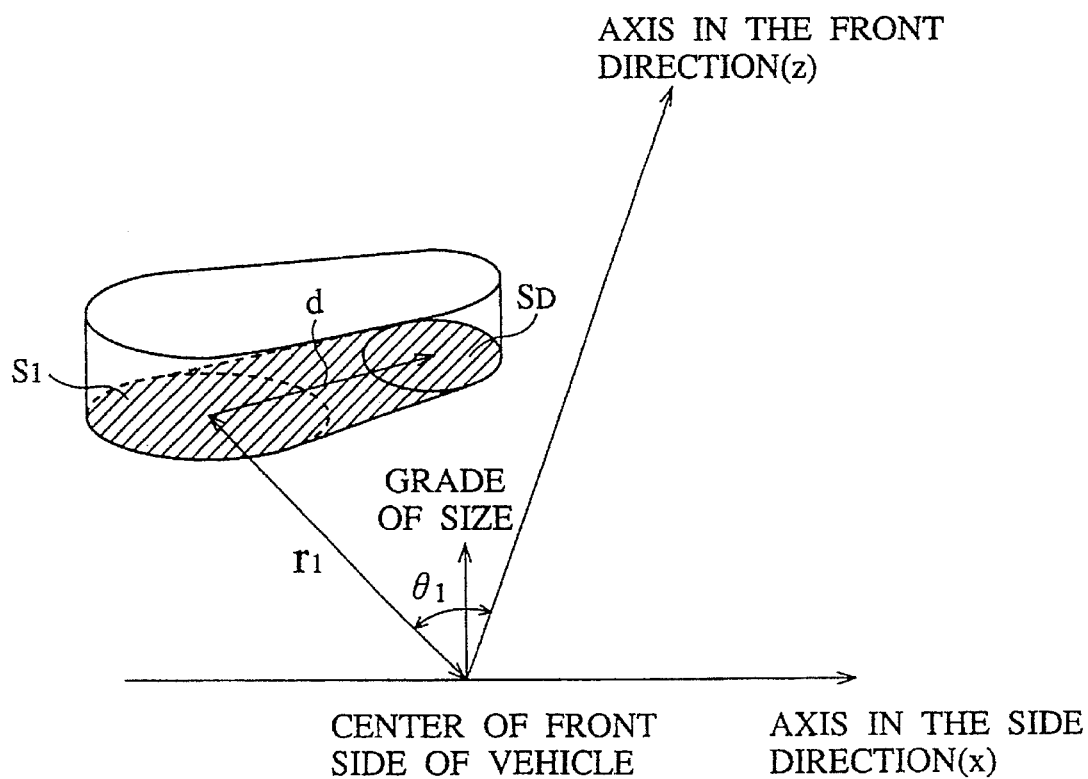
FIG. 21 is a display view showing the presence of the obstacle.
Figure 22:
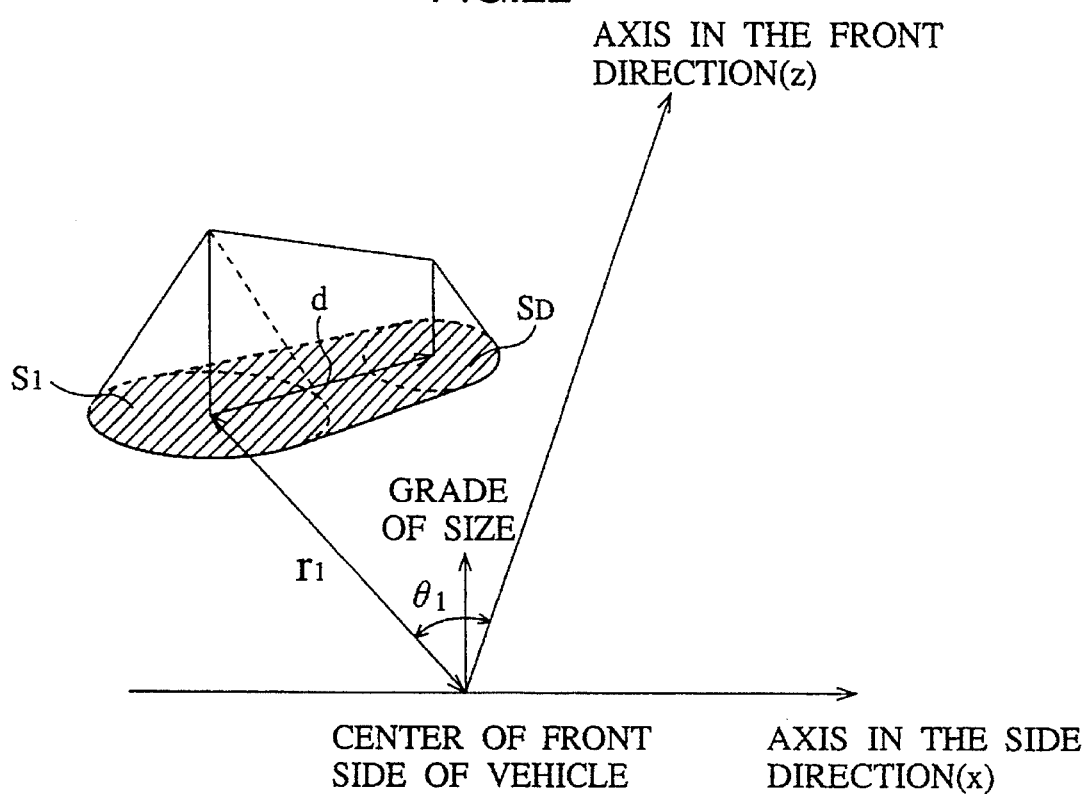
FIG. 22 is a display view showing the presence of the obstacle.
Figure 23:
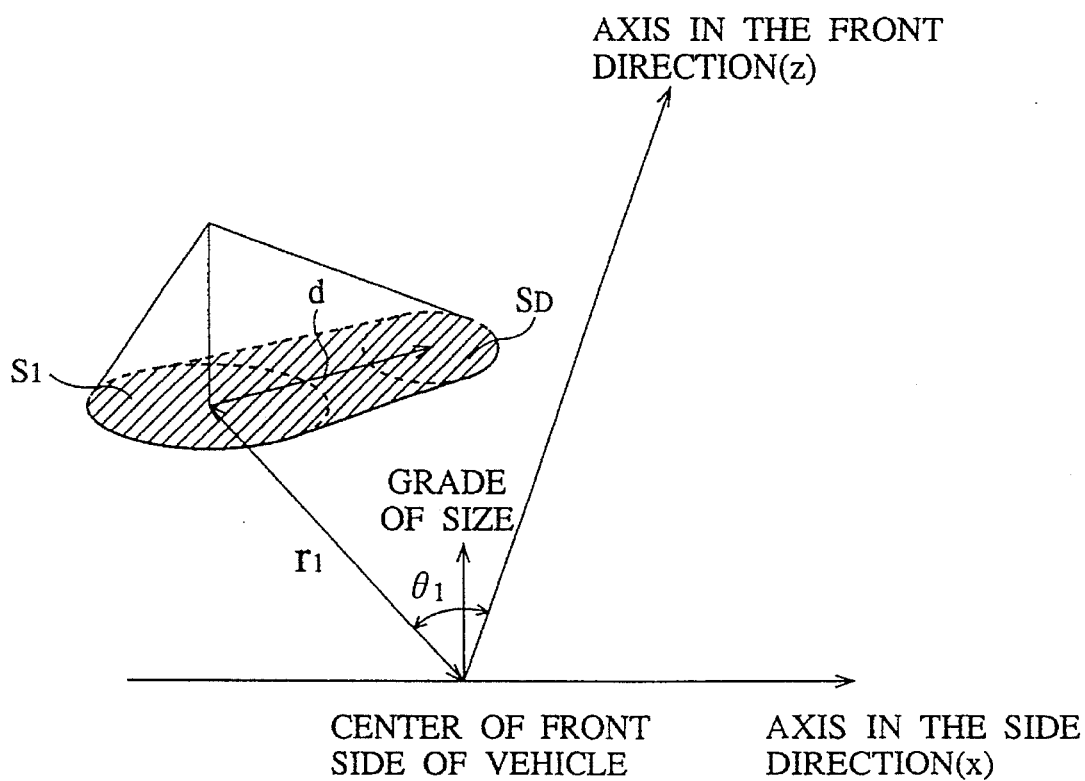
FIG. 23 is a display view showing the presence of the obstacle.
Figure 24:
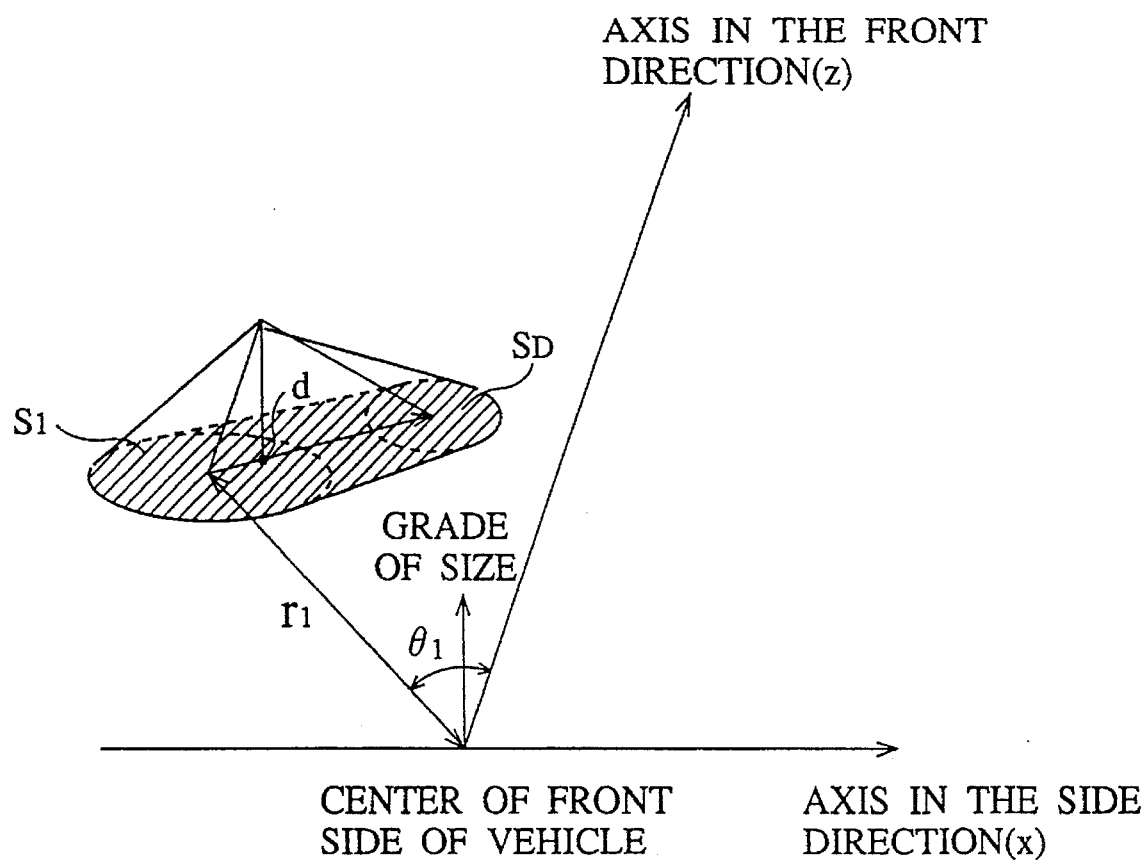
FIG. 24 is a display view showing the presence of the obstacle.

Referring now to FIG. 21, the size index $S_1$ and the amount of movement of the obstacle are indicated by a bottom area of the three-dimensional figure, and referring to FIG. 22, a bottom area and a height of each circular cone correspond to the index $S_1$ and the amount $S_D$ of movement. Referring to FIG. 23, a vertex is provided on a circle corresponding to the index $S_1$, and FIG. 24 illustrates a three-dimensional figure in which a vertex is provided at the center of gravity of both the circles.

Though the embodiment 8 has been described with reference to the circular cone or the like, the present invention may employ any desired form which can indicate the size index $S_1$ of the obstacle in three dimensions.

Embodiment 9

Figure 25:
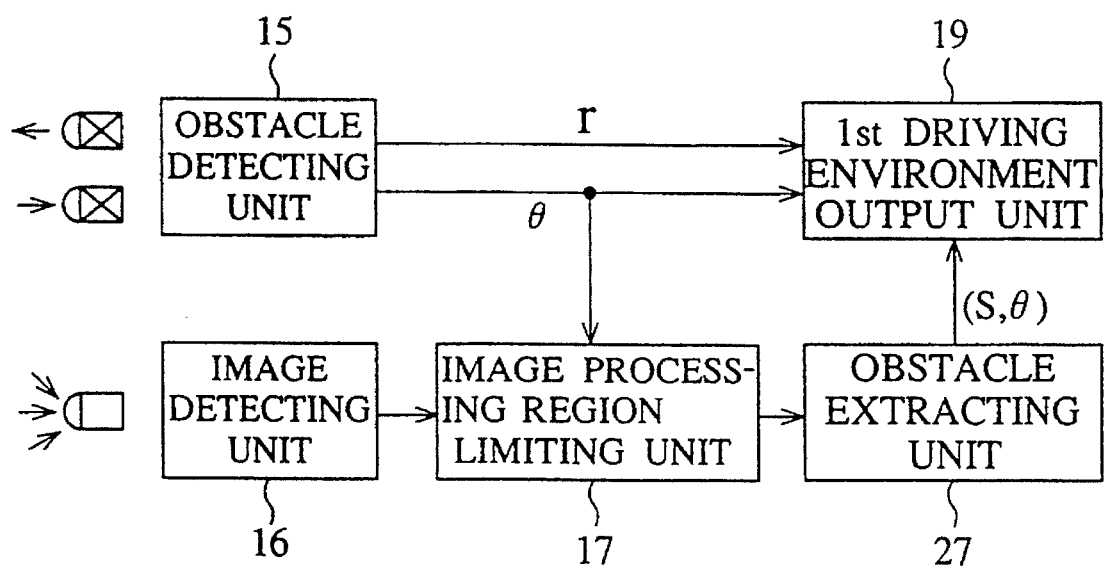
FIG. 25 is a block diagram showing a driving environment surveillance apparatus according to the embodiment 9 of the present invention.

FIG. 25 is a block diagram showing a driving environment surveillance apparatus according to the embodiment 9 of the present invention. In the drawing, reference numeral 27 means an obstacle extracting unit for extracting an obstacle from a two-dimensional image provided by an image processing region limiting unit 17 so as to calculate a size index S of the obstacle, and for extending the index S if the obstacle has a height y greater than a width x thereof.

A description will now be given of the operation.

Figure 26:
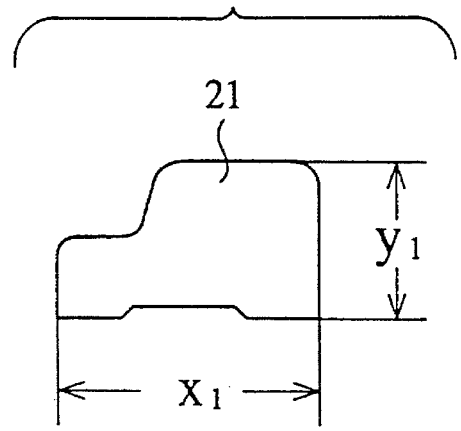
FIG. 26 is an outline diagram showing outlines of the obstacles.
Figure 26:
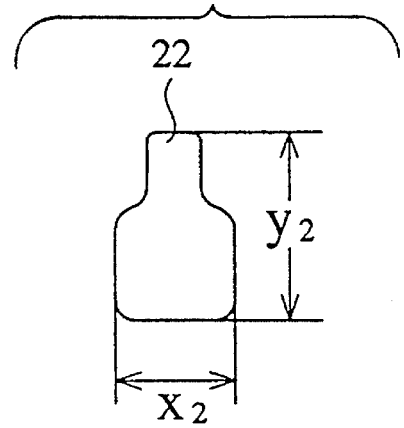

For example, in case two obstacles are present, it is assumed that the obstacle extracting unit 27 extracts the obstacles as in the embodiment 1, resulting in outlines of the obstacles as shown in FIG. 26.

While, as in the embodiment 1, the obstacle extracting unit 27 determines the size indexes $S_1$ and $S_2$ of obstacles 21 and 22 according to calculation using the expressions (3) and (4), the resultant indexes $S_1$ and $S_2$ are not employed as final determination, and the operation proceeds to the following processing.

That is, the obstacle extracting unit 27 further determines ratios $\epsilon_1$ and $\epsilon_2$ of the heights to the widths of the obstacles 21 and 22 (i.e., $\epsilon_1=y_1/x_1$, $\epsilon_2=y_2/x_2$) to multiply the previously determined indexes $S_1$ and $S_2$ by the extension coefficients according to the ratios $\epsilon_1$ and $\epsilon_2$ as follows:

$$S_1 = \text{extension coefficient} \times S_1 \tag{6}$$

$$S_2 = \text{extension coefficient} \times S_2 \tag{7}$$

Each extension coefficient according to the ratio $\epsilon$ is set as follows:

A. the extension coefficient being 1 for $\epsilon<1$

In this case, the obstacle has the height greater than the width thereof so that the indexes S provided by the expressions (3) and (4) are outputted as final indexes S.

B. the extension coefficient being a for $1<\epsilon<\epsilon_a$ ($a\geq 1$)

In this case, an upper limit value $\epsilon_a$ (for example, $\epsilon_a=2$) is set such that the ratio of height to width is in a range corresponding to a motor-cycle vehicle, and the extension coefficient a is set at, for example, 2.

C. the extension coefficient being b for $\epsilon_a<\epsilon<\epsilon_b$ ($b\geq 1$ and $b>a$)

In this case, a lower limit value $\epsilon_a$ and an upper limit value $e_b$ (for example, $\epsilon_b=3$) are set such that the ratio of height to width is in a range corresponding to a human body, and the extension coefficient b is set at, for example, 4.

Therefore, if the ratio $\epsilon_1$ of the obstacle 21 meets the condition A and the ratio $\epsilon_2$ of the obstacle 22 meets the condition B, the size indexes $S_1$, $S_2$ of the obstacles 21 and 22 can be expressed as follows:

$$S_1 = 1 \times S_1 \tag{8}$$

$$S_2 = a \times S_2 \tag{9}$$

As set forth above, the extension coefficient is multiplied in view of the ratio of height to width of the obstacle in the embodiment 9. It is thereby possible to display the obstacle such as the motor-cycle vehicle or the human body which is small but is seriously dangerous in a large size, and to more clearly indicate the degree of danger, resulting in appropriate decision of potential of collision.

Embodiment 10

Figure 27:
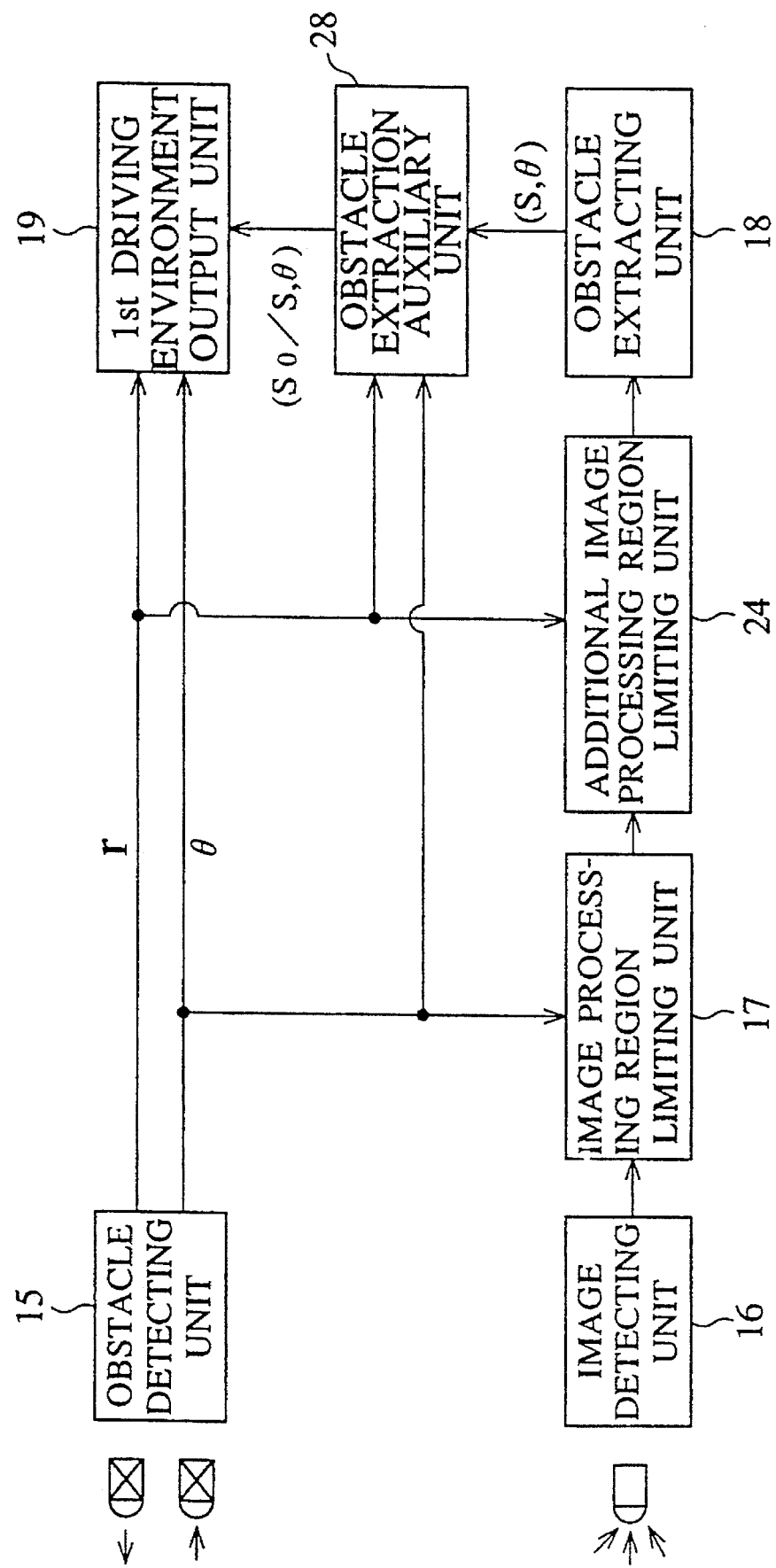
FIG. 27 is a block diagram showing a driving environment surveillance apparatus according to the embodiment 10 of the present invention.

FIG. 27 is a block diagram showing a driving environment surveillance apparatus according to the embodiment 10 of the present invention. In the drawing, reference numeral 28 means an obstacle extracting auxiliary unit for referring to a size index $S_0(r)$ of an obstacle which is preset according to a relative distance r to the obstacle in case the relative distance r and an azimuth $\theta$ to the obstacle are detected by laser radars 11 to 14, and in case an obstacle extracting unit 18 outputs no size index S of the obstacle, and for outputting the size index $S_0(r)$ of the obstacle corresponding to the distance r detected by the laser radars 11 to 14 to a driving environment output unit 19.

The operation will described hereinafter.

As an example, a description will be given of a case where only one obstacle is present, and the laser radar 11 detects the obstacle 21.

Typically, when the laser radar 11 detects the obstacle 21, the obstacle extracting unit 18 calculates and outputs the size index $S_1$ of the obstacle. However, when any malfunction occurs in image processing or the calculation for the index is not completely finished, the obstacle extracting unit 18 sometimes outputs no index $S_1$ even if the laser radar 11 detects the relative distance $r_1$ and the azimuth $\theta_1$ to the obstacle 21.

Figure 28:
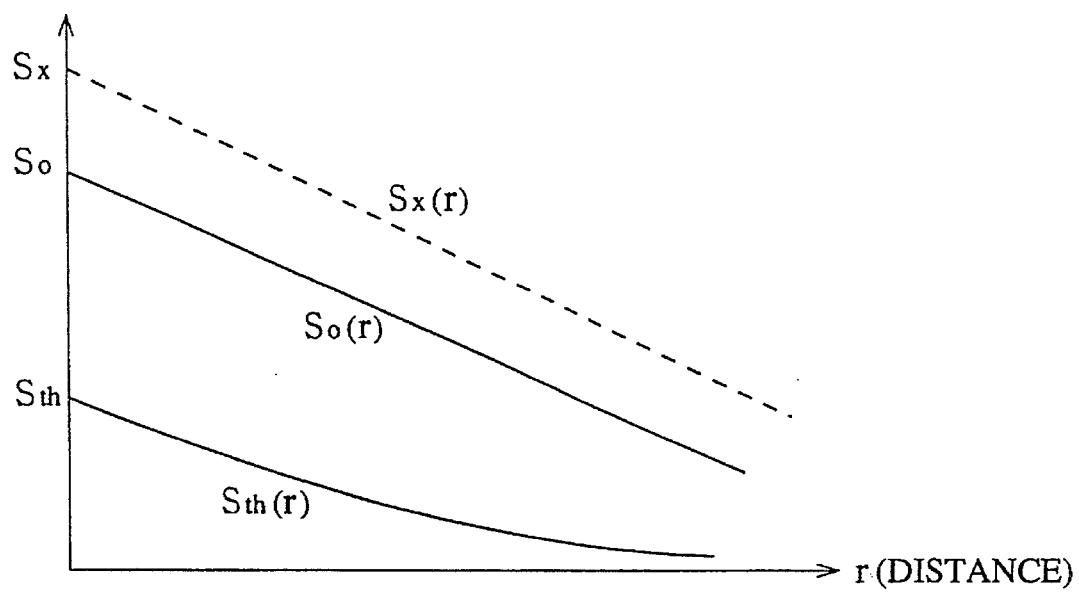
FIG. 28 is a graph diagram showing a relation between an index and a distance.

Hence, the obstacle extracting auxiliary unit 28 refers to decision reference data $S_{th}(r_1)$ associated with the distance $r_1$ in decision reference data $S_{th}(r)$ which is preset according to the distance r to the obstacle 21 when the laser radar 11 detects the relative distance $r_1$ and the azimuth $\theta_1$ to the obstacle 21 (see FIG. 28). Then, the obstacle extracting auxiliary unit 28 compares the decision reference data $S_{th}(r_1)$ with data S outputted from the obstacle extracting unit 18 (which outputs, for example, zero value data when it outputs no index $S_1$).

If the data S is greater than the decision reference data $S_{th}(r_1)$, the obstacle extracting auxiliary unit 28 normally decides that the index $S_1$ is outputted from the obstacle extracting unit 18, and feeds the driving environment output unit 19 with the index $S_1$ as it is. However, if the data S is less than the decision reference data $S_{th}(r_1)$, the obstacle extracting auxiliary unit 28 decides that any malfunction occurs in the image processing. Then, the obstacle extracting auxiliary unit 28 refers to decision reference data $S_0(r_1)$ associated with the distance $r_1$ in decision reference data $S_0(r)$ which is preset according to the distance r to the obstacle (see FIG. 28), and outputs the index $S_0(r_1)$ to the driving environment output unit 19.

Figure 29:
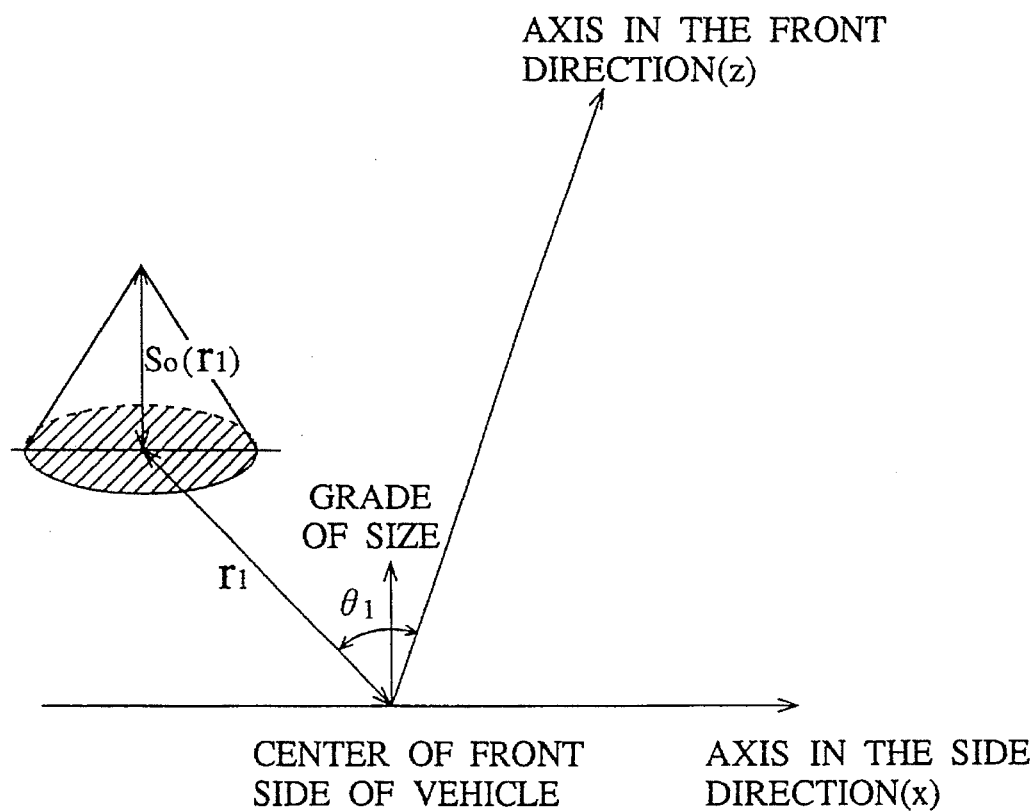
FIG. 29 is a display view showing the presence of the obstacle.

FIG. 29 shows an illustrative output from the driving environment output unit 19.

In the embodiment 10, as described above, when the obstacle extracting unit 18 outputs no index $S_1$, the obstacle extracting auxiliary unit 28 outputs the index $S_0(r_1)$. As a result, it is possible to inform a driver of the present obstacle even if any malfunction occurs in the image processing.

Embodiment 11

Figure 30:
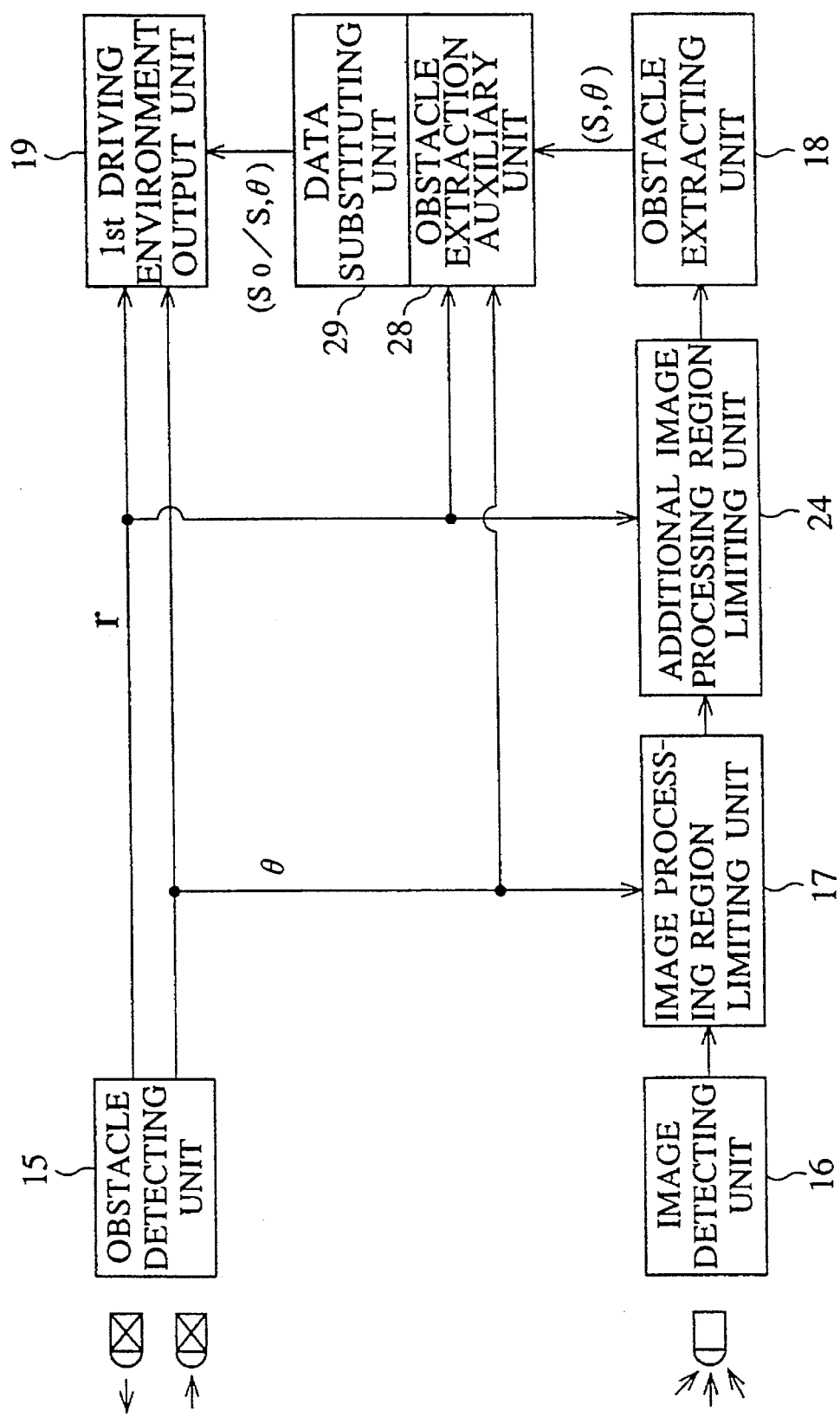
FIG. 30 is a block diagram showing a driving environment surveillance apparatus according to the embodiment 11 of the present invention.

FIG. 30 is a block diagram showing a driving environment surveillance apparatus according to the embodiment 11 of the present invention. In the drawing, reference numeral 29 means a data substituting unit for outputting, instead of a size index $S_0(r)$ of an obstacle outputted from the obstacle extracting auxiliary unit 28, a substitution index $S_x(r)$ having a greater value than that of the size index $S_0(r)$ to a driving environment output unit 19 in case laser radars 11 to 14 detect a relative distance r and an azimuth 8 to the obstacle, and the laser radars 11 to 14 output no size index S of the obstacle even after the elapse of a predetermined time $T_0$ or more from the detection of the distance r and the azimuth θ.

A description will now be given of the operation.

Figure 31:
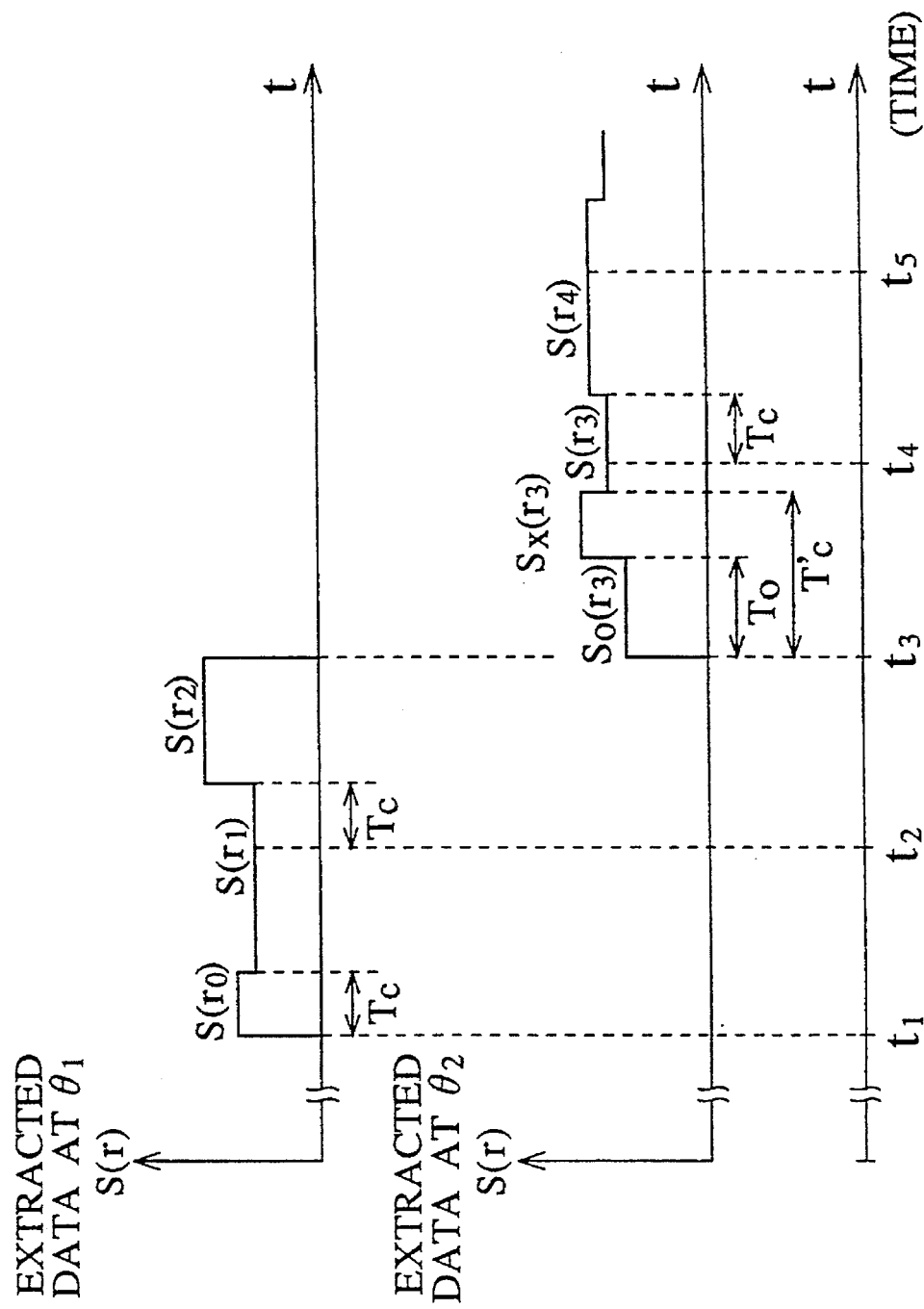
FIG. 31 is a time chart diagram showing the movement of the obstacle.

FIG. 31 shows a condition where the obstacle 21 moves from a region I into a region II, that is, a condition where the obstacle 21 is present in the region I for a time period from $t_1$ to $t_3$, and enters the region II at a time $t_3$.

In the embodiment, while the obstacle extracting unit 18 normally outputs a size index $S(r_2)$ of the obstacle 21 immediately before the time $t_3$, calculation of a size index $S(r_3)$ of the obstacle 21 depending upon a distance $r_3$ and an azimuth $\theta_2$ is not completely finished immediately after the obstacle 21 enters the region II (i.e., at the time $t_3$). Therefore, the obstacle extracting auxiliary unit 28 refers, as a preliminary step, to and outputs the index $S_0(r_3)$ associated with the distance $r_3$ as in the embodiment 10.

However, in the embodiment, since the obstacle extracting unit 18 outputs no index $S(r_3)$ even after the elapse of the predetermined time $T_0$ from output of the index $S_0(r_3)$ by the obstacle extracting auxiliary unit 28, the data substituting unit 29 decides that any malfunction occurs in the image processing. In this connection, the predetermined time $T_0$ is set at a sufficiently longer time period than a time $T_c$ required for calculation of the index $S(r_3)$ when the image processing is normally performed.

Accordingly, the data substituting unit 29 outputs a value $S_x(r_3)$ which is greater than the index $S_0(r_3)$ outputted from the obstacle extracting auxiliary unit 28 instead of $S_0(r_3)$ so as to clarify the malfunction in the image processing to bring driver's attention to occurrence of the malfunction.

In this connection, $S_x(r)$ is an index which is present according to the distance r to the obstacle as in the case of $S_0(r)$.

In the embodiment 11, as set forth above, when the obstacle extracting unit 18 outputs no index $S(r_3)$ even after the elapse of the predetermined time $T_0$ or more from output of the index $S_0(r_3)$ by the obstacle extracting auxiliary unit 28, the data substituting unit 29 outputs a value $S_x(r_3)$ instead of $S_0(r_3)$. As a result, a figure is displayed in a larger size so as to more surely bring the driver's attention to the malfunction.

The embodiment 11 has been described with reference to a case where the distance r corresponding to the representative azimuths $\theta_1$, $\theta_2$, $\theta_3$, and $\theta_4$, and input/output of the index S are processed in parallel. However, a register may be provided to hold each data for a predetermined time period, and to process the input/output and transmission of data in series by a single transmission line in synchronization with clock having a short cycle which is a quarter or less than a time period from the time $t_1$ to $t_2$.

Embodiment 12

Figure 32:
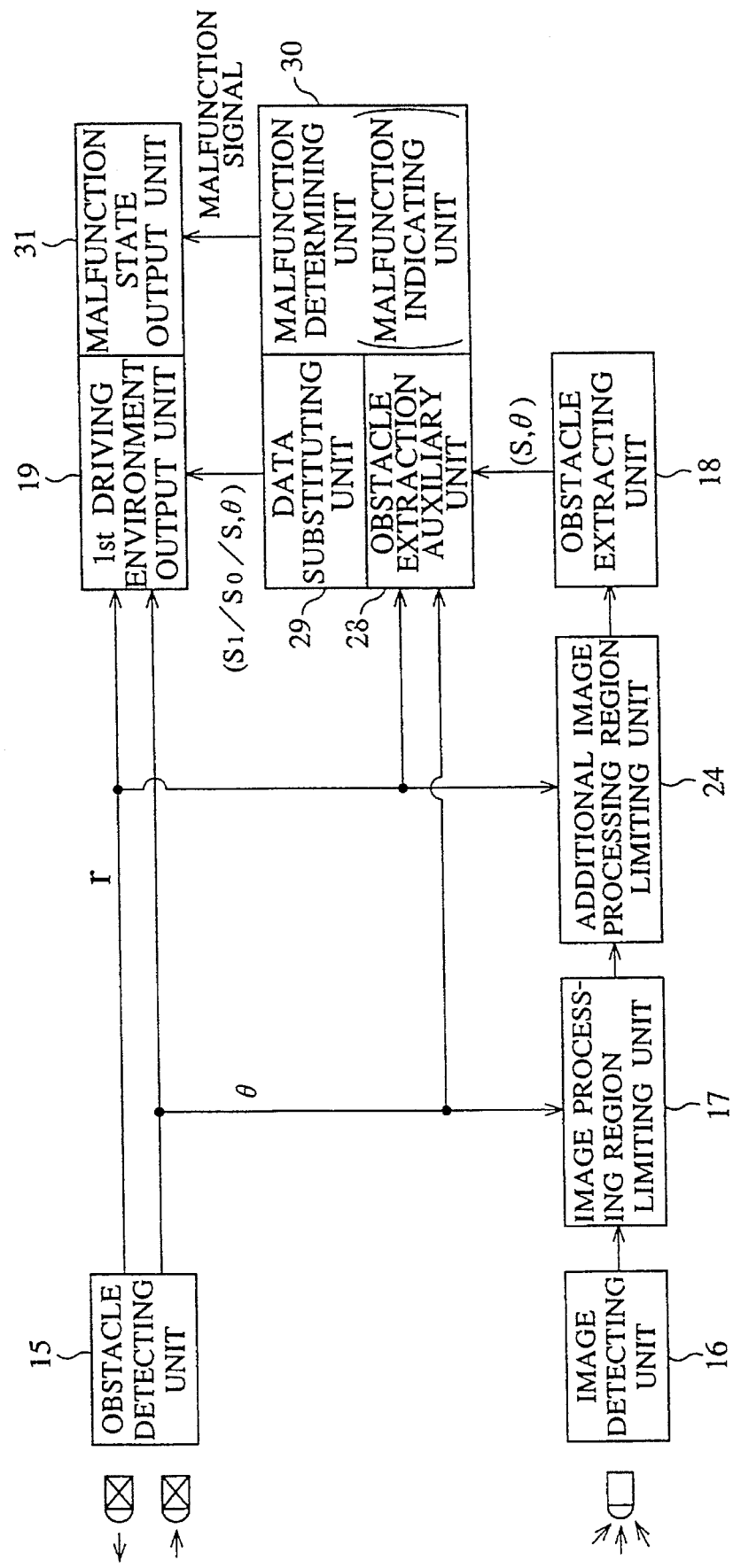
FIG. 32 is a block diagram showing a driving environment surveillance apparatus according to the embodiment 12 of the present invention.
Figure 33:
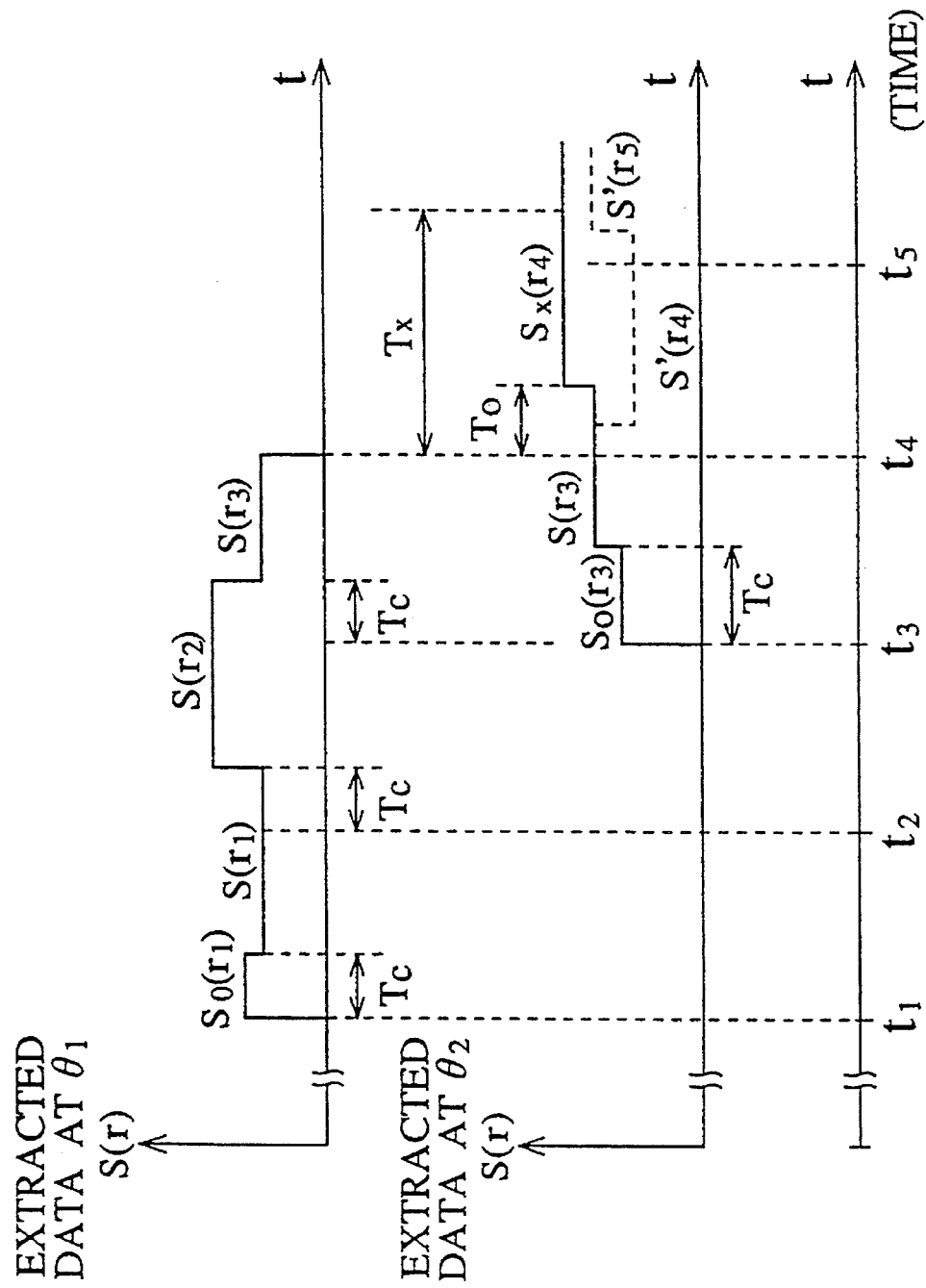
FIG. 33 is a time chart diagram showing the movement of the obstacle.

The embodiment 11 has been described with reference to a case where a data substituting unit 29 outputs $S_x(r_3)$ instead of an index $S_0(r_3)$. Alternatively, as shown in FIGS. 32 and 33, in case an obstacle extracting unit 18 does not output a size index S(r) of an obstacle even after the elapse of a predetermined time period $T_x$ or more from detection of a relative distance r and an azimuth θ by laser radars 11 to 14, a malfunction determining unit 30 (a malfunction indicating unit) may decide that any malfunction occurs, and a malfunction state output unit 31 (a malfunction indicating unit) may indicate the occurrence of the malfunction.

As an example of output of the malfunction state output unit 31, a conical figure corresponding to the obstacle in FIG. 19 may be flickered, or characters such as "Fail" may be displayed on the same display. Alternatively, a known voice generating apparatus may be employed to generate a speech such as "Fail in image processing system," or an alarm may be used to generate beep sound.

Embodiment 13

The embodiments have been described with reference to a system to survey an obstacle in a peripheral region in front of a vehicle 1. However, the present invention may be applied to a system to survey the obstacle in a peripheral region in a side direction or in back of the vehicle 1.

As stated above, according to the first aspect of the present invention, the region where the obstacle is present is specified depending upon the azimuth detected by the obstacle detecting unit so as to derive the two-dimensional image corresponding to the specified region from the image detecting unit, and the obstacle is extracted from the two-dimensional image so as to calculate the size index of the obstacle. Thereby, it is sufficient for the obstacle extracting unit on the subsequent stage to extract the obstacle from only the two-dimensional image corresponding to the specified region. Further, it is sufficient for the obstacle detecting unit to have a detection accuracy with such a degree that the presence of the obstacle can be detected. As a result, there is an effect in that, for example, a detection time can be considerably reduced without degradation of the detection accuracy as compared with a conventional apparatus.

According to the second aspect of the present invention, the region specified by the image processing region limiting unit is limited according to the distance detected by the obstacle detecting unit, and the two-dimensional image corresponding to the limited region is derived from the image processing region limiting unit. As a result, there is an effect in that, for example, a processing time in the obstacle extracting unit on a subsequent stage can be more reduced than would be in the first aspect of the present invention.

According to the third aspect of the present invention, the amount of movement of the obstacle is predicted depending upon the distance and the azimuth currently detected by the obstacle detecting unit and the previously detected distance and azimuth, and the position where the obstacle is present is specified in the real spacial coordinate with respect to the driving road of the vehicle depending upon the distance and the azimuth currently detected by the obstacle detecting unit so as to display the figure indicating the size index and the amount of movement of the obstacle at the specified position, thereby enabling a driver to recognize to what extent the obstacle will move. As a result, there is an effect in that, for example, the driver can accurately grasp potential of collision.

According to the fourth aspect of the present invention, the size index and the amount of movement of the obstacle are indicated by the sizes of the circles, respectively, and the circle representing the amount of movement is indicated by the concentric circle positioned on the outer periphery of the circle representing the size index of the obstacle. It is thereby possible to enable a driver to easily and intuitively recognize the size and so forth of the obstacle. As a result, there is an effect in that, for example, the driver can accurately grasp potential of collision.

According to the fifth aspect of the present invention, the amount of movement and the movement direction of the obstacle are predicted depending upon the distance and the azimuth currently detected by the obstacle detecting unit and the previously detected distance and azimuth, and the one position where the obstacle is present is specified depending upon the distance and the azimuth currently detected by the obstacle detecting unit and the other position where the obstacle will be present after the movement is specified depending upon the amount of movement and the movement direction in a real spacial coordinate with respect to the driving road of the vehicle so as to display the figure indicating the size index of the obstacle at the position where the obstacle is present and another figure indicating the amount of movement at the position where the obstacle will be present after the movement. It is thereby possible to enable a driver to recognize to which direction and to what extent the obstacle will move. As a result, there is an effect in that, for example, the driver can accurately grasp potential of collision.

According to the sixth aspect of the present invention, the size index and the amount of movement of the obstacle are indicated by the size of the circle, and the line which could be the common tangent line for each circle is indicated. As a result, it is possible to enable a driver to easily and intuitively recognize the size, the movement direction and so forth of the obstacle. As result, there is an effect in that, for example, the driver can accurately grasp potential of collision.

According to the seventh aspect of the present invention, the size index of the obstacle is indicated by the three-dimensional figure having the size according to the index. It is thereby possible to enable a driver to easily and intuitively recognize the size of the obstacle. As a result, there is an effect in that, for example, the driver can accurately grasp potential of collision.

According to the eighth aspect of the present invention, the size index and the amount of movement of the obstacle are indicated by the three-dimensional figure having the size according to the index and the amount of movement. It is thereby possible to enable a driver to easily and intuitively recognize the size and so forth of the obstacle. As a result, there is an effect in that, for example, the driver can accurately grasp potential of collision.

According to the ninth aspect of the present invention, the size index of the obstacle determined according to the calculation is extended in case the obstacle has the height greater than the width thereof. As a result, there is an effect in that, for example, it is possible to indicate an obstacle, which is small but may be seriously dangerous, in a large size.

According to the tenth aspect of the present invention, the size index of the obstacle, which is preset according to the relative distance to the obstacle, is referred in case the relative distance and the azimuth to the obstacle are detected by the obstacle detecting unit and in case the obstacle extracting unit outputs no size index of the obstacle, and the size index of the obstacle corresponding to the distance detected by the obstacle detecting unit is outputted to the driving environment output unit. As a result, there is an effect in that, for example, it is possible to inform a driver of presence of the obstacle even if any malfunction should occur in image processing or calculation of the index should not completely be finished.

According to the eleventh aspect of the present invention, instead of the size index of the obstacle outputted from the obstacle extracting auxiliary unit, the substitution index having a greater value than that of the size index is outputted to the driving environment output unit in case the obstacle detecting unit detects the relative distance and the azimuth to the obstacle, and in case the obstacle extracting unit outputs no size index of the obstacle even after the elapse of the predetermined time or more from the detection of the distance and the azimuth. As a result, there are effects in that, for example, it is possible to inform a driver of presence of the obstacle even if any malfunction probably occurs in image processing, and to enable the driver to recognize serious danger.

According to the twelfth aspect of the present invention, it is decided that any malfunction occurs so as to indicate the occurrence of the malfunction in case the obstacle detecting unit detects the relative distance and the azimuth to the obstacle and the obstacle extracting unit does not output the size index of the obstacle even after the elapse of the predetermined time period or more from the detection of the relative distance and the azimuth. As a result, there is an effect in that, for example, it is possible to inform a driver of occurrence of malfunction in image processing.

While preferred embodiments of the invention have been described using specific terms, such description is for illustrative purposes only, and it is to be understood that changes and variations may be made without departing from the spirit or scope of the following claims.

What is claimed is:

1. A driving environment surveillance apparatus comprising:

an obstacle detecting unit for scanning a plurality of divided peripheral regions in a travelling direction of a vehicle so as to, if an obstacle is present in said peripheral regions, detect a relative distance and an azimuth to said obstacle from said vehicle;

an image detecting unit for detecting two-dimensional images in said peripheral regions;

an image processing region limiting unit for specifying a region where an obstacle is present depending upon said azimuth detected by said obstacle detecting unit so as to derive a two-dimensional image corresponding to said specified region from said image detecting unit;

an obstacle extracting unit for extracting said obstacle from said two-dimensional image derived by said image processing region limiting unit so as to calculate a size index of said obstacle; and a driving environment output unit for specifying a position where said obstacle is present in a real spacial coordinate with respect to a driving road of said vehicle depending upon said distance and said azimuth detected by said obstacle detecting unit so as to display a figure indicating said size index of said obstacle at said specified position.

2. A driving environment surveillance apparatus comprising:

an obstacle detecting unit for scanning a plurality of divided peripheral regions in a travelling direction of a vehicle so as to, if an obstacle is present in said peripheral regions, detect a relative distance and an azimuth to said obstacle from said vehicle;

an image detecting unit for detecting two-dimensional images in said peripheral regions;

an image processing region limiting unit for specifying a region where an obstacle is present depending upon said azimuth detected by said obstacle detecting unit so as to derive a two-dimensional image corresponding to said specified region from said image detecting unit;

a correcting unit for limiting said region specified by said image processing region limiting unit according to said distance detected by said obstacle detecting unit so as to derive a two-dimensional image corresponding to said limited region from said image processing region limiting unit;

an obstacle extracting unit for extracting said obstacle from said two-dimensional image limited by said correcting unit so as to calculate a size index of said obstacle; and a driving environment output unit for specifying a position where said obstacle is present in a real spacial coordinate with respect to a driving road of said vehicle depending upon said distance and said azimuth detected by said obstacle detecting unit so as to display a figure indicating said size index of said obstacle at said specified position.

3. A driving environment surveillance apparatus comprising:

an obstacle detecting unit for scanning a plurality of divided peripheral regions in a travelling direction of a vehicle so as to, if an obstacle is present in said peripheral regions, detect a relative distance and an azimuth to said obstacle from said vehicle;

an image detecting unit for detecting two-dimensional images in said peripheral regions;

an image processing region limiting unit for specifying a region where an obstacle is present depending upon said azimuth detected by said obstacle detecting unit so as to derive a two-dimensional image corresponding to said specified region from said image detecting unit;

an obstacle extracting unit for extracting said obstacle from said two-dimensional image derived by said image processing region limiting unit so as to calculate a size index of said obstacle;

a first driving environment output unit for specifying a position where said obstacle is present in a real spacial coordinate with respect to a driving road of said vehicle depending upon said distance and said azimuth detected by said obstacle detecting unit so as to display a figure indicating said size index of said obstacle at said specified position;

a predicting unit for predicting an amount of movement of said obstacle depending upon said distance and said azimuth currently detected by said first driving environment output unit and previously detected distance and azimuth;

a second driving environment output unit for specifying a position where said obstacle is present in a real spacial coordinate with respect to a driving road of said vehicle depending upon said distance and said azimuth currently detected by said obstacle detecting unit so as to display a figure indicating said size index and said amount of movement of said obstacle at said specified position.

4. A driving environment surveillance apparatus according to claim 3, wherein said second driving environment output unit indicates said size index and said amount of movement of said obstacle by sizes of circles, respectively, and indicates one of said circles representing said amount of movement by a concentric circle positioned on an outer periphery of the other one of said circles representing said size index of said obstacle.

5. A driving environment surveillance apparatus comprising:

an obstacle detecting unit for scanning a plurality of divided peripheral regions in a travelling direction of a vehicle so as to, if an obstacle is present in said peripheral regions, detect a relative distance and an azimuth to said obstacle from said vehicle;

an image detecting unit for detecting two-dimensional images in said peripheral regions;

an image processing region limiting unit for specifying a region where an obstacle is present depending upon said azimuth detected by said obstacle detecting unit so as to derive a two-dimensional image corresponding to said specified region from said image detecting unit;

an obstacle extracting unit for extracting said obstacle from said two-dimensional image derived by said image processing region limiting unit so as to calculate a size index of said obstacle;

a driving environment output unit for specifying a position where said obstacle is present in a real spacial coordinate with respect to a driving road of said vehicle depending upon said distance and said azimuth detected by said obstacle detecting unit so as to display a figure indicating said size index of said obstacle at said specified position;

a predicting unit for predicting an amount of movement and a movement direction of said obstacle depending upon said distance and said azimuth currently detected by said first driving environment output unit and previously detected distance and azimuth; and a second driving environment output unit for specifying one position where said obstacle is present depending upon said distance and said azimuth currently detected by said obstacle detecting unit and said other position where said obstacle will be present after said movement depending upon said amount of movement and said movement direction predicted by said predicting unit in a real spacial coordinate with respect to a driving road of a vehicle so as to display a figure indicating said size index of said obstacle at said position where said obstacle is present and another figure indicating said amount of movement at said position where said obstacle will be present after said movement.

6. A driving environment surveillance apparatus according to claim 5, wherein said second driving environment output unit indicates said size index and said amount of movement of said obstacle by sizes of circles, respectively, and indicates a line which could be a common tangent line for each of said circles.

7. A driving environment surveillance apparatus according to claim 1 or 2, wherein said driving environment output unit indicates said size index of said obstacle by a three-dimensional figure having a size according to the index.

8. A driving environment surveillance apparatus according to claim 3 or 5, wherein said second driving environment output unit indicates said size index and said amount of movement of said obstacle by a three-dimensional figure having a size according to said index and said amount of movement.

9. A driving environment surveillance apparatus according to any one of claims 1 to 3, and 5, wherein said obstacle extracting unit extends said size index of said obstacle determined according to said calculation in case the obstacle has a height greater than a width thereof.

10. A driving environment surveillance apparatus according to any one of claims 1 to 3, and 5, further comprising:

an obstacle extracting auxiliary unit for referring to a size index of an obstacle preset according to a relative distance to said obstacle in case said relative distance and an azimuth to said obstacle are detected by an obstacle detecting unit and said obstacle extracting unit outputs no size index of said obstacle, and outputting said size index of said obstacle corresponding to said distance detected by said obstacle detecting unit to said driving environment output unit.

11. A driving environment surveillance apparatus according to claim 10, further comprising:

a data substituting unit for outputting, instead of said size index of said obstacle outputted from said obstacle extracting auxiliary unit, a substitution index having a greater value than that of said size index to said driving environment output unit in case said obstacle detecting unit detects said relative distance and said azimuth to said obstacle and said obstacle extracting unit outputs no size index of said obstacle even after said elapse of said predetermined time or more from said detection of said distance and said azimuth.

12. A driving environment surveillance apparatus according to claim 10, further comprising:

a malfunction indicating unit for deciding that any malfunction occurs to indicate said malfunction in case said obstacle detecting unit detects said relative distance and said azimuth to said obstacle and said obstacle extracting unit does not output said size index of said obstacle even after said elapse of a predetermined time period or more from detection of said relative distance and said azimuth.

\* \* \* \* \*